US012150220B2

(12) United States Patent
Adachi et al.

(10) Patent No.: US 12,150,220 B2
(45) Date of Patent: Nov. 19, 2024

(54) METHOD FOR MANUFACTURING LIGHT-EMITTING ELEMENT INLCUDING QUANTUM DOTS

(71) Applicant: SHARP KABUSHIKI KAISHA, Sakai (JP)

(72) Inventors: Takahiro Adachi, Sakai (JP); Jun Sakuma, Sakai (JP); Yasushi Asaoka, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 183 days.

(21) Appl. No.: 17/909,635

(22) PCT Filed: Mar. 24, 2020

(86) PCT No.: PCT/JP2020/013096

§ 371 (c)(1),
(2) Date: Sep. 6, 2022

(87) PCT Pub. No.: WO2021/192056

PCT Pub. Date: Sep. 30, 2021

(65) Prior Publication Data

US 2023/0354487 A1 Nov. 2, 2023

(51) Int. Cl.
*B05D 3/02* (2006.01)
*H05B 33/10* (2006.01)

(52) U.S. Cl.
CPC ........... *H05B 33/10* (2013.01); *B05D 3/0254* (2013.01)

(58) Field of Classification Search
CPC ....... H05B 33/10; H05B 33/12; B05D 3/0254
See application file for complete search history.

(56) References Cited

U.S. PATENT DOCUMENTS

| | | | | |
|---|---|---|---|---|
| 2008/0074037 A1* | 3/2008 | Fukase | H10K 71/233 313/504 |
| 2008/0087792 A1* | 4/2008 | Evitt, Sr. | F16M 3/00 248/676 |
| 2009/0087792 A1 | 4/2009 | Iizumi et al. | |

FOREIGN PATENT DOCUMENTS

| | | | | |
|---|---|---|---|---|
| JP | 2003217842 A | 7/2003 | |
| JP | 2008010251 A | 1/2008 | |
| JP | 2009087760 A | 4/2009 | |
| JP | 2013157171 A | 8/2013 | |
| WO | WO-2018168225 A1 * | 9/2018 | C09D 11/30 |

* cited by examiner

*Primary Examiner* — William P Fletcher, III
(74) *Attorney, Agent, or Firm* — ScienBiziP, P.C.

(57) ABSTRACT

A method for manufacturing a functional element including a pixel, the method includes: applying a coating containing a curable material and a functional material; curing the coating applied by the applying the coating; and adjusting a film thickness of the coating cured by the curing the coating to decrease the film thickness of the coating.

10 Claims, 48 Drawing Sheets

CROSS-SECTIONAL VIEW OF TURNING-AROUND PORTION

G-G CROSS-SECTIONAL VIEW

H-H CROSS-SECTIONAL VIEW

METHOD FOR MANUFACTURING LIGHT-EMITTING ELEMENT INLCUDING QUANTUM DOTS

TECHNICAL FIELD

The disclosure relates to a method for manufacturing a functional element including a pixel, and a functional element.

BACKGROUND ART

In order to provide a method for manufacturing an electro-luminescence (EL) element that can easily prevent color mixing of pixel lines and enable high-resolution patterning, a method for manufacturing an EL element is known (Patent Literature (PTL) 1) in which at least one organic EL layer constituting the EL element is patterned using a dispenser. In this manufacturing method, a coating liquid for forming an organic EL layer is continuously pushed out of a nozzle of the dispenser and at least one of a substrate and the dispenser is moved, thereby forming a pattern having a line shape.

CITATION LIST

Patent Literature

PTL 1: JP 2003-217842 A (published on Jul. 31, 2003)

SUMMARY OF INVENTION

Technical Problem

However, in the manufacturing method of PTL 1 cited above, the substrate in which the coating pattern of the coating liquid applied to form the organic EL layer is prepared is dried in an oven at 100° C. for 30 minutes. As a result, drying unevenness in the coating pattern is generated by the coffee ring effect based on the evaporation of a solvent of the coating liquid, which raises a problem that it is difficult to form a uniform thin film.

Solution to Problem

To solve the above problem, a method for manufacturing a functional element according to an aspect of the disclosure is a functional element manufacturing method for manufacturing a functional element including a pixel configured to emit or receive light. The method includes applying a coating containing a curable material and a functional material, curing the coating applied by the applying a coating, and adjusting a film thickness of the coating cured by the curing the coating by decreasing the film thickness of the coating.

To solve the above problem, a functional element according to an aspect of the disclosure includes a functional region constituted of a plurality of pixel lines extending linearly for emitting or receiving light, and a peripheral region formed outside the functional region. Pixels of an identical color are disposed being linearly aligned in each of the pixel lines, the pixel line adjacent to each of the pixel lines is constituted of pixels of a different color, a function layer having an identical thickness is continuously formed in each of the pixel lines, and the function layer contains a curable material.

Advantageous Effects of Disclosure

According to an aspect of the disclosure, it is possible to provide a functional element manufacturing method for manufacturing a functional element in which a uniform thin film with a tiny dimension is formed, and a functional element.

DESCRIPTION OF EMBODIMENTS

First Embodiment

Figure 1:
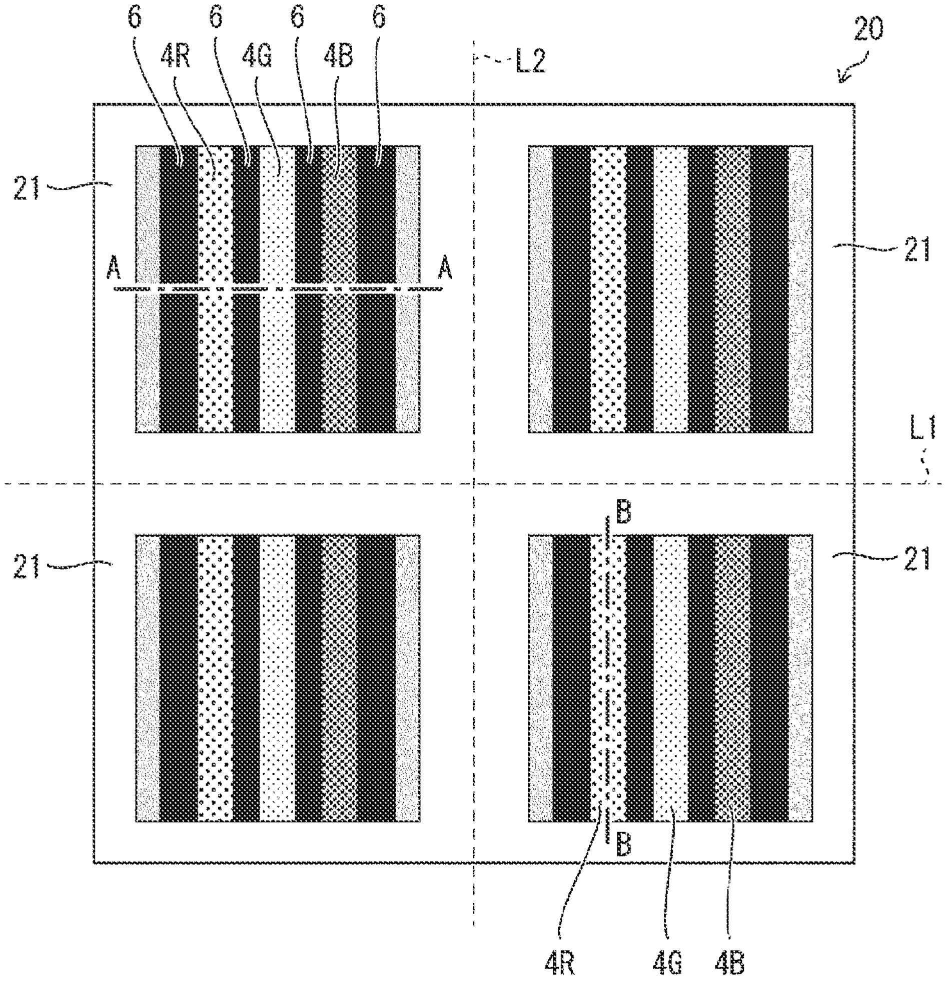
FIG. 1 is a top view for describing a method for manufacturing a substrate of a functional element according to a first embodiment.

FIG. 1 is a top view for describing a method for manufacturing a substrate of a functional element according to a first embodiment. A panel 21 according to a functional element of the present embodiment is prepared by cutting a mother substrate 20 along broken lines L1 and L2. In this manner, a plurality of the panels 21 are prepared from the single mother substrate 20.

Figure 2:
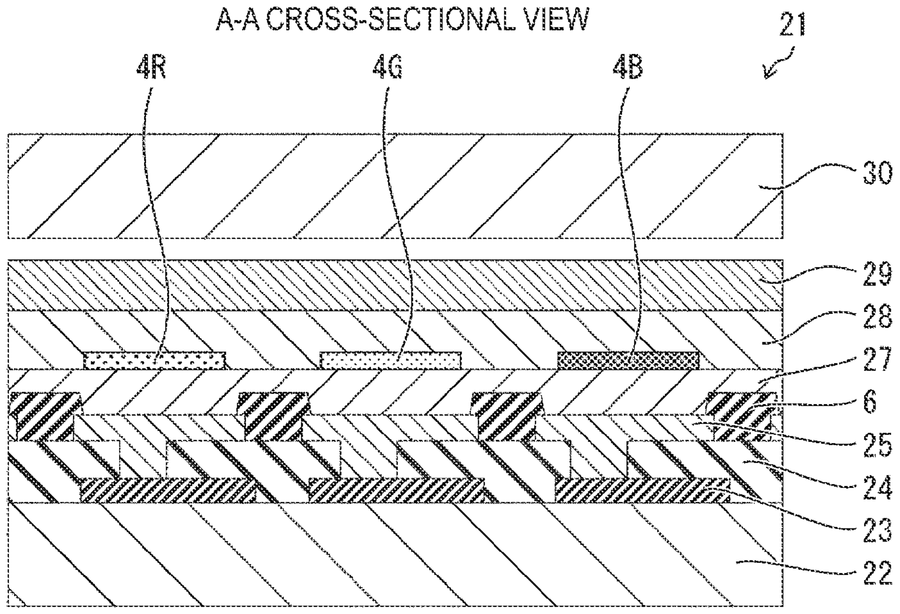
FIG. 2 is a cross-sectional view taken along a plane A-A illustrated in FIG. 1.
Figure 3:
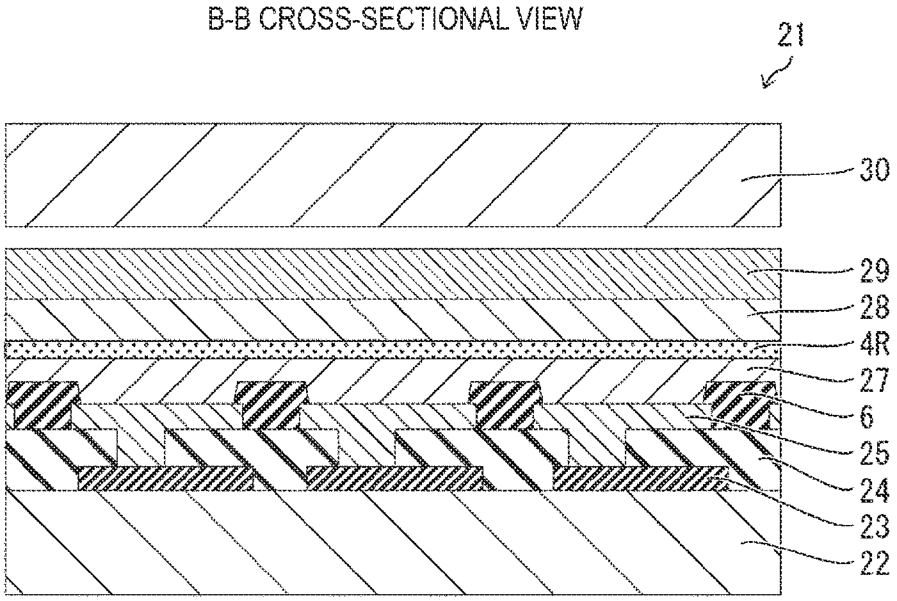
FIG. 3 is a cross-sectional view taken along a plane B-B illustrated in FIG. 1.

FIG. 2 is a cross-sectional view taken along a plane A-A illustrated in FIG. 1. FIG. 3 is a cross-sectional view taken along a plane B-B illustrated in FIG. 1. The panel 21 includes a thin film transistor (TFT) substrate 22. On the TFT substrate 22, a thin film transistor 23, a through-hole (TH) layer 24, a cathode electrode (CE) 25, a bank 6, an electron transportation layer (ETL) 27, emissive layers (EMLs) 4R, 4G and 4B, a hole transportation layer (HTL) 28, an anode electrode (AE) 29, and a counter substrate 30 are formed in that order. Each layer is prepared by a technique such as spinning, vapor deposition, or sputtering. The combination and the arrangement order of the layers illustrated in FIG. 2 and FIG. 3 are merely an example and may be changed as appropriate.

Figure 4:
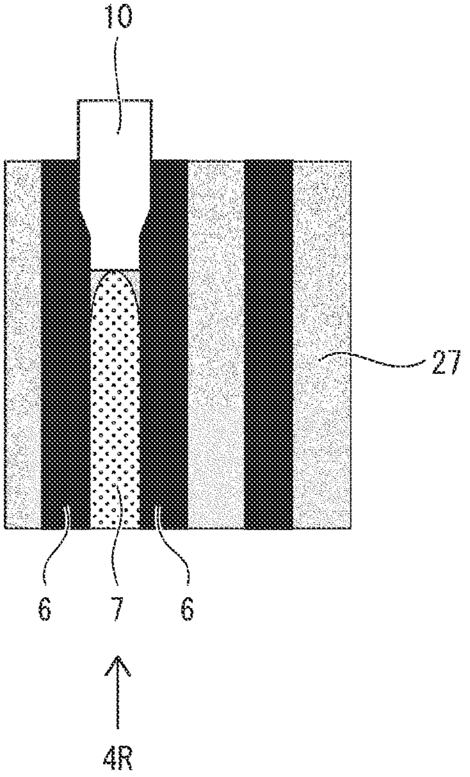
FIG. 4 is a top view illustrating an aspect of drawing with a first coating by a dispenser on an electron transportation layer of the functional element.
Figure 5:
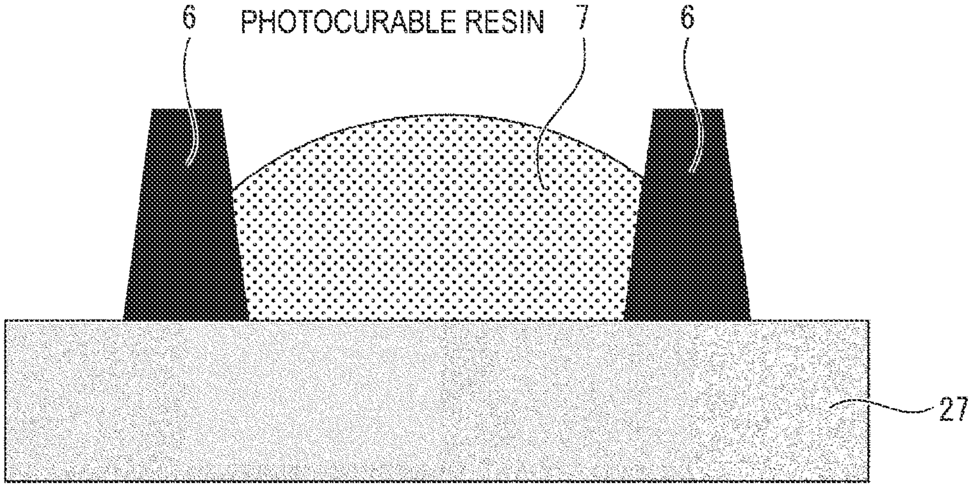
FIG. 5 is a side cross-sectional view illustrating the first coating set by drawing on the electron transportation layer.
Figure 6:
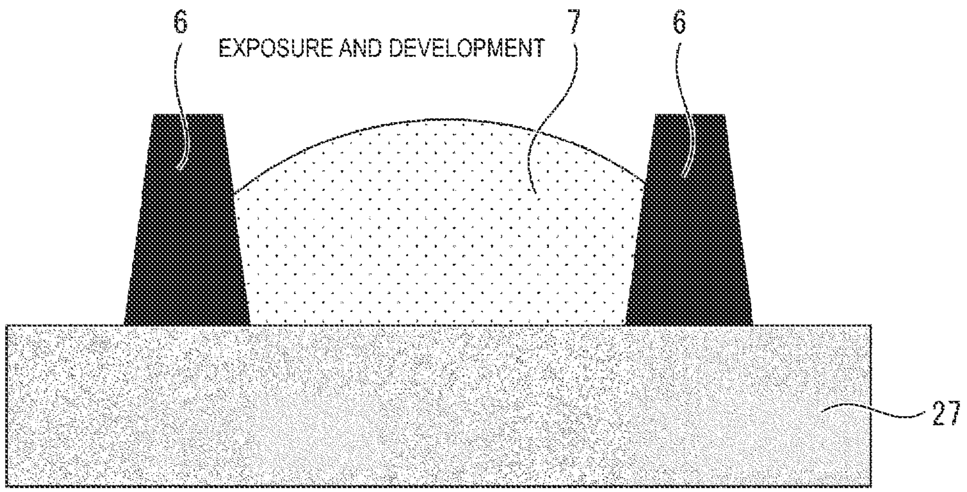
FIG. 6 is a side cross-sectional view illustrating an aspect of exposing and developing the first coating set by drawing on the electron transportation layer.
Figure 7:
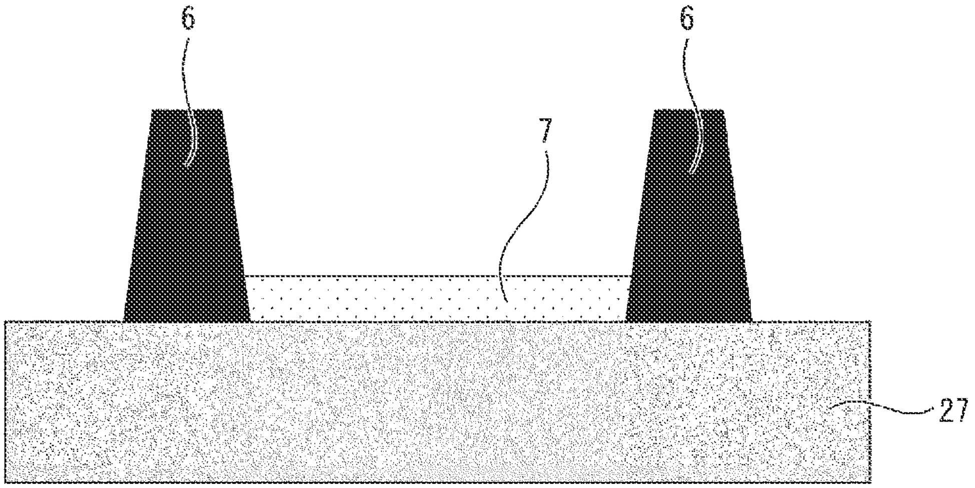
FIG. 7 is a side cross-sectional view illustrating an aspect in which a film thickness of the exposed and developed first coating is adjusted.
Figure 8:
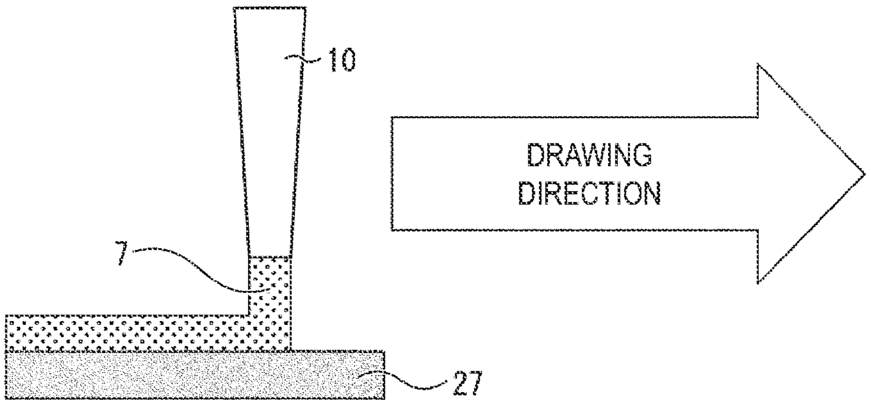
FIG. 8 is a side cross-sectional view illustrating an aspect of drawing with the first coating by a dispenser on the electron transportation layer.

FIG. 4 is a top view illustrating an aspect of drawing with a first coating 7 by a dispenser 10 on an electron transportation layer 27 provided in the above-mentioned functional element. FIG. 5 is a side cross-sectional view illustrating the first coating 7 set by drawing on the electron transportation layer 27. FIG. 6 is a side cross-sectional view illustrating an aspect of exposing and developing the first coating 7 set by drawing on the electron transportation layer 27 is exposed and developed. FIG. 7 is a side cross-sectional view illustrating an aspect in which a film thickness of the exposed and developed first coating 7 is adjusted. FIG. 8 is a side cross-sectional view illustrating an aspect of drawing with the first coating 7 by the dispenser 10 on the electron transportation layer 27.

Figure 14:
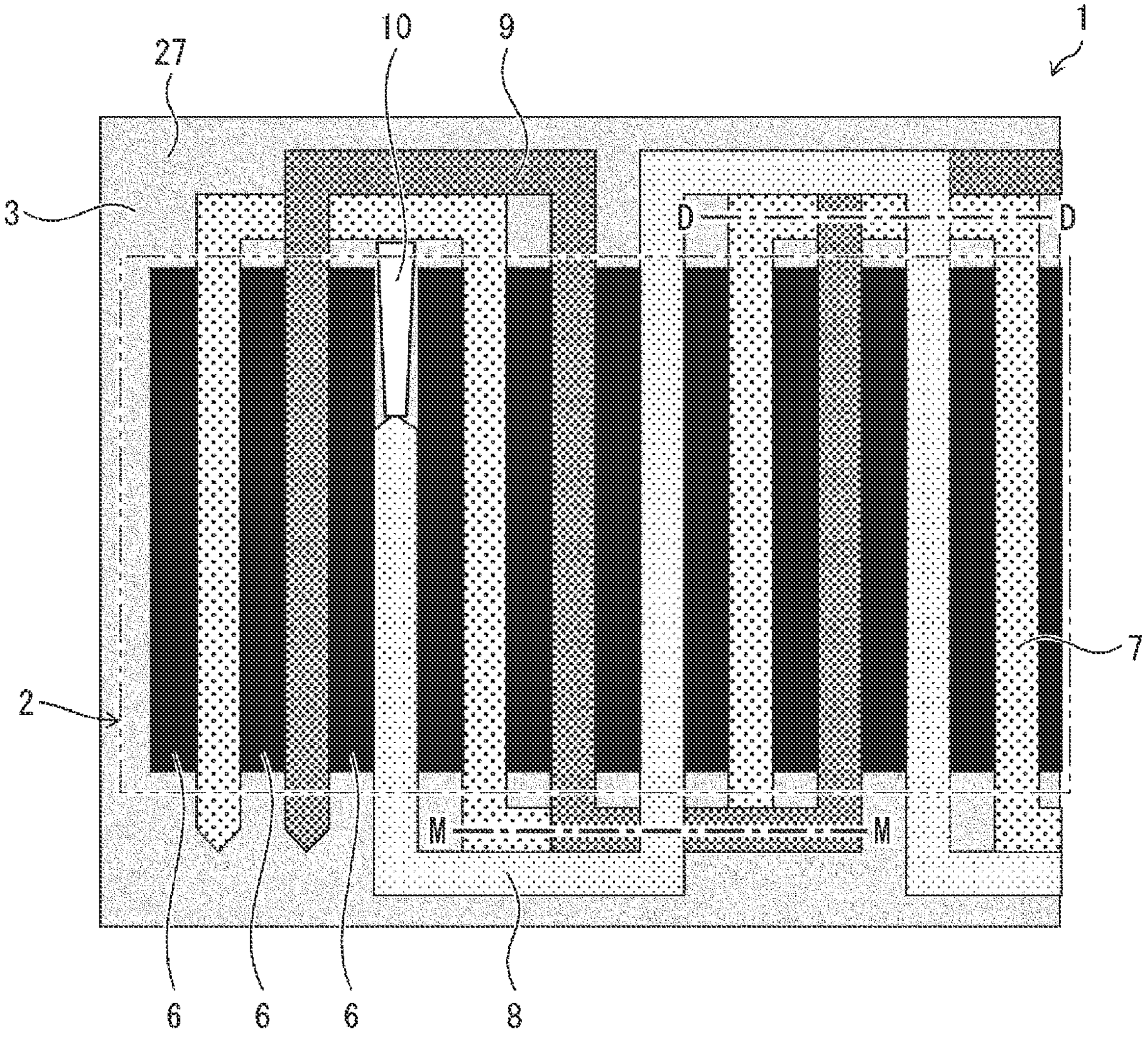
FIG. 14 is a top view illustrating an aspect of drawing quantum dot resists of three colors on the lower layer of the emissive layer.

The emissive layer 4R is formed on the electron transportation layer 27. A plurality of the banks 6 in a stripe shape are formed on the electron transportation layer 27 in parallel with each other at predetermined intervals. As illustrated in FIG. 4 and FIG. 5, the first coating 7 for emitting red light is used for drawing by the dispenser 10 between a pair of banks 6 adjacent to each other along an extending direction of the bank 6. Similarly, a second coating 8 for emitting green light is used for drawing by the dispenser 10 along the bank 6, and a third coating 9 for emitting blue light is used for drawing performed by the dispenser 10 along the bank 6 (FIG. 14). The dispenser 10 may perform drawing while moving relative to the electron transportation layer 27, or may perform drawing while, conversely, moving the electron transportation layer 27 relative to the dispenser 10. Both of them may be moved during the drawing.

The first coating 7, the second coating 8, and the third coating 9 each include a curable material and a functional material. The curable material is a material that cures under a predetermined condition, and is, for example, a photocurable resin. The functional material is, for example, quantum dots. The first coating 7, the second coating 8, and the third coating 9 can be applied by the dispenser 10, and have such a high viscosity that the shape does not easily change after being applied. As illustrated in FIG. 5, the first coating 7 set by drawing between the paired banks 6 on the electron transportation layer 27 is exposed, and thus the first coating 7 is cured as illustrated in FIG. 6. Subsequently, as illustrated in FIG. 7, the film thickness of the first coating 7 is reduced by developing the first coating 7 having been cured by exposure. The film thickness of the first coating 7 to be reduced is adjusted by the exposure amount and development conditions. A layer formed in a functional region in which pixels are formed by the first coating 7, the second coating 8, and the third coating 9 serves as a function layer in the functional element.

The first coating 7, the second coating 8, and the third coating 9 preferably include cellulose nanofibers (CNFs).

As illustrated in FIG. 8, an ejection port through which the dispenser 10 ejects the first coating 7 is separated from a drawing surface on the electron transportation layer 27. The distance between the dispenser 10 and the electron transportation layer 27 is adjusted to an appropriate distance in accordance with the viscosity of the first coating 7, the drawing speed of the dispenser 10, and the like.

Figure 9:
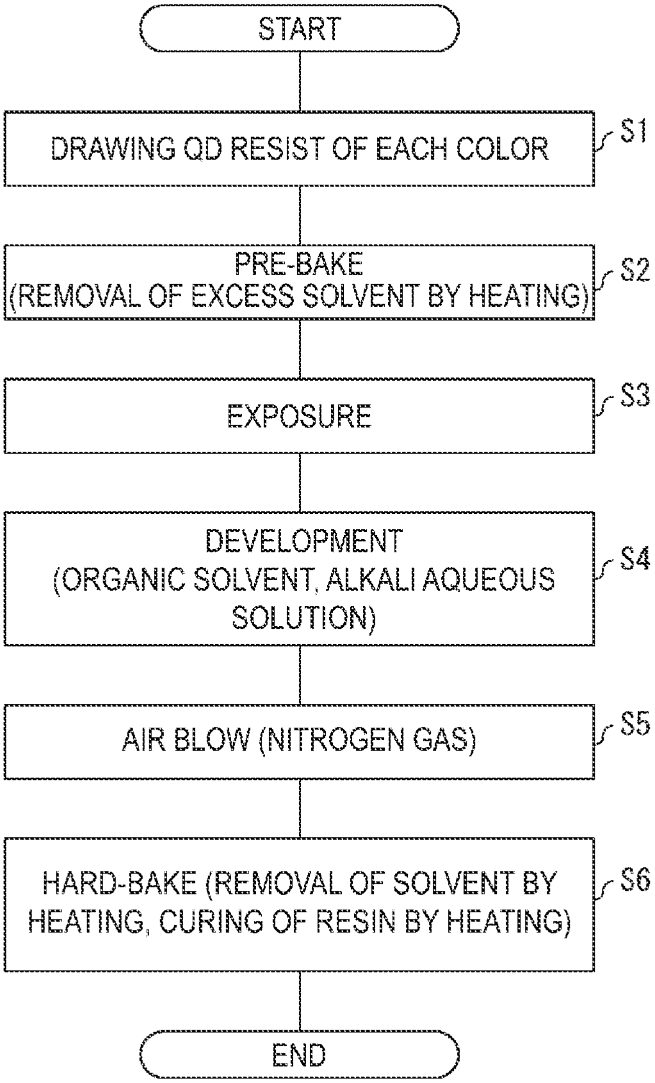
FIG. 9 is a flowchart illustrating a procedure of a method for manufacturing a functional element according to the first embodiment.

FIG. 9 is a flowchart illustrating a procedure of a method for manufacturing the functional element according to the first embodiment. First, an application step is performed in which the first coating 7 for red light, the second coating 8 for green light, and the third coating 9 for blue light are applied for drawing by the dispenser 10 between the banks 6 adjacent to each other on the electron transportation layer 27 (step S1). The bank 6, a black matrix, and an edge cover are mainly formed of an acryl-based insulating material, a polyimide-based insulating material, or the like. When the bank 6 is constituted by a transparent material, the aperture ratio of the functional element is improved. Examples of the resist materials of the first coating 7, the second coating 8, and the third coating 9 may include an acrylic resin and an epoxy resin.

Then, a pre-bake step is performed in which an excess solvent of each of the first coating 7, the second coating 8, and the third coating 9 having been applied for drawing is removed by heating (step S2). Subsequently, a curing step is performed in which the first coating 7, the second coating 8, and the third coating 9 having experienced the pre-bake step are cured by being exposed (step S3). Examples of an exposure light source may include a mercury lamp, a metal halide lamp, an argon gas laser, x-rays, and electron beams.

Thereafter, a film thickness adjustment step is performed in which the first coating 7, the second coating 8, and the third coating 9 having been cured by the exposure are developed by an organic solvent and an alkali aqueous solution so as to reduce the film thickness of each of the first coating 7, the second coating 8, and the third coating 9 (step S4). Examples of the developing solution may include an inorganic alkali-based developing solution KOH aq., an organic alkali-based developing solution TMAH aq., and organic solvent-based developing solutions PGMEA, toluene, and chloroform. Depending on the developing solutions, it is necessary to subject the first coating 7, the second coating 8, and the third coating 9 having been cured by the exposure to washing by water.

Then, an air blow with a nitrogen gas is performed on the first coating 7, the second coating 8, and the third coating 9 after the development (step S5). Next, in order to remove the solvent of and to cure the resin of the first coating 7, second coating 8, and third coating 9 by heating, a hard-bake step is performed (step S6).

The first coating 7, the second coating 8, and the third coating 9 may be thermosetting resins, and may be cured by being heated. The first coating 7, the second coating 8, and the third coating 9 may be etched, instead of being developed, to reduce the film thicknesses thereof.

Figure 10:
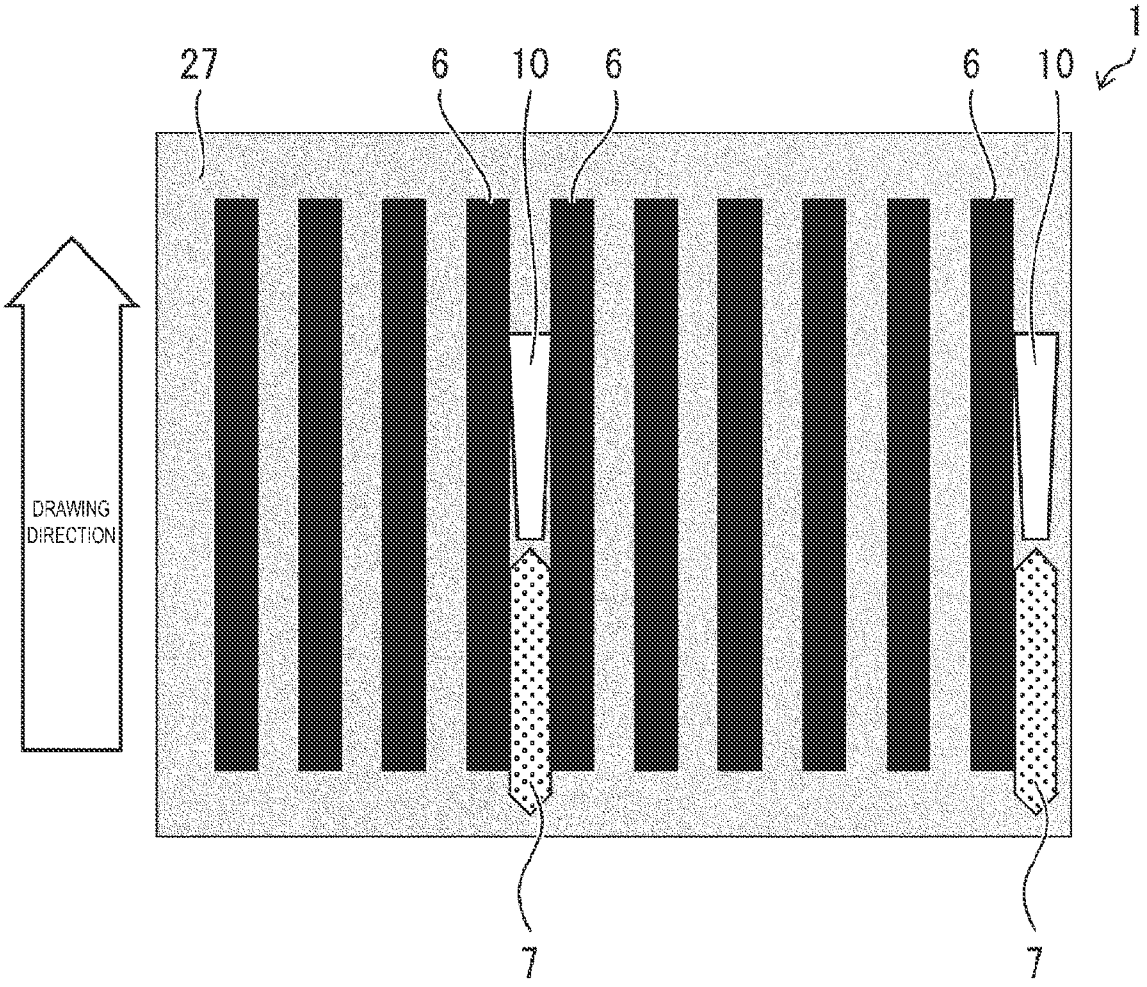
FIG. 10 is a top view illustrating an aspect of drawing, before a U-turn, with the first coating of a single color by two dispensers on a lower layer of an emissive layer.
Figure 11:
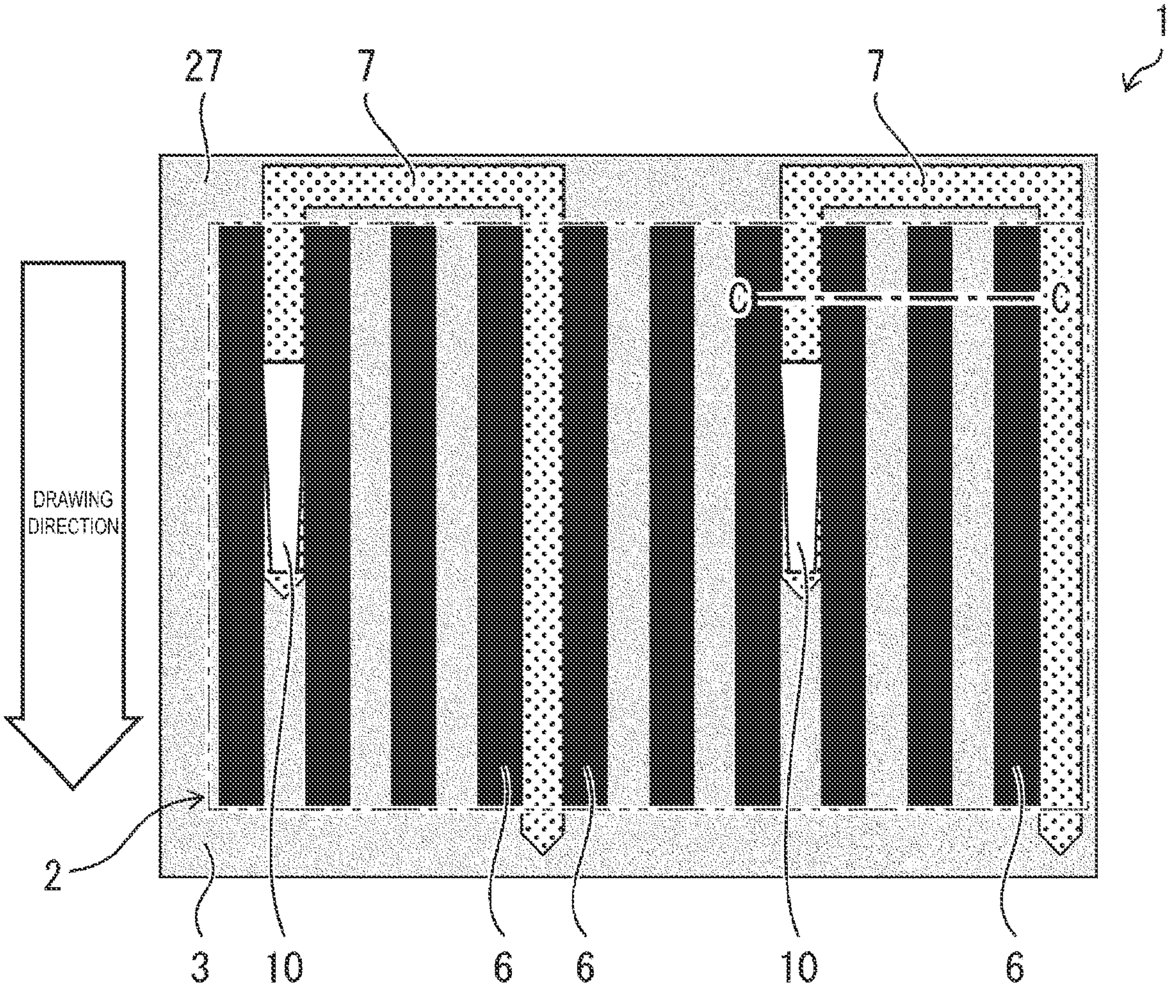
FIG. 11 is a top view illustrating an aspect of drawing, after a U-turn, with the first coating of a single color by two dispensers on the lower layer of the emissive layer.
Figure 12:
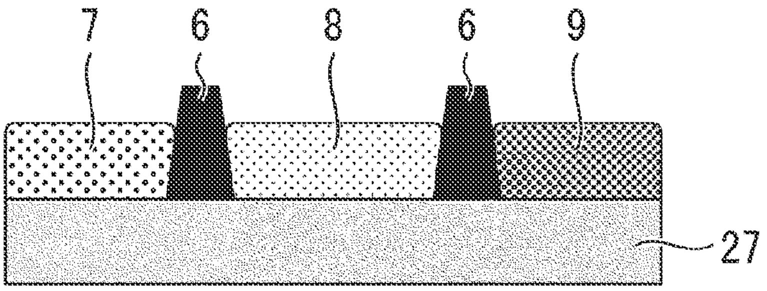
FIG. 12 is a cross-sectional view taken along a plane C-C illustrated in FIG. 11.
Figure 13:
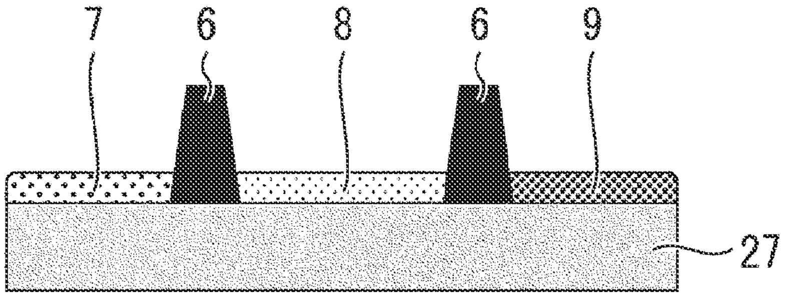
FIG. 13 is a cross-sectional view taken along the plane C-C after exposure and development.

FIG. 10 is a top view illustrating an aspect of drawing, before a U-turn, with the first coating 7 of a single color by two dispensers 10 on the electron transportation layer 27. FIG. 11 is a top view illustrating an aspect of drawing, after a U-turn, with the first coating 7 of the single color by the two dispensers 10 on the electron transportation layer 27. FIG. 12 is a cross-sectional view taken along a plane C-C illustrated in FIG. 11. FIG. 13 is a cross-sectional view taken along the plane C-C after exposure and development.

A light-emitting element 1 (functional element) includes a display region 2, in which pixels are formed, and a peripheral region 3 formed in such a manner as to surround the display region 2. The display region 2 is a functional region in which a function layer is formed. The dispenser 10 starts the application of the first coating 7 from the peripheral region 3 outside the display region 2, and terminates the application of the first coating 7 in the peripheral region 3 outside of the display region 2; the first coating 7 is continuously applied in the display region 2 between the start of the application and termination of the application.

In this way, when the drawing with the first coating 7 ejected by the dispenser 10 is started at the outside of the display region 2 and the direction of the drawing with the first coating 7 by the dispenser 10 is turned around by making a U-turn at the outside of the display region 2, a uniform pixel line of the first coating 7 can be formed inside the display region 2. It is preferable that the ejection of the first coating 7 formed of a quantum dot resist (QD resist) be continuously performed by the dispenser 10 even at the time of turning around the drawing direction without stopping every time the drawing direction is turned around, because a defective ejection, an increase in drawing processing time, and the like may be prevented.

The bank 6 is formed for separately patterning the pixel line of each color; the bank 6 arranged between the pixel lines of different colors is formed higher, while the bank 6 formed between the pixel lines of the same color is formed lower. This improves the aperture ratio of the pixels of the light-emitting element 1. In addition, contact interference between the pixel lines of different colors is unlikely to occur when the dispenser 10 moves.

Since a plurality of pixels of the same color are aligned in a single pixel line extending linearly, the pixels of the same color are disposed being linearly aligned in each pixel line.

First, the step of drawing and pre-baking a single color pixel line is repeated the number of times corresponding to the necessary colors. In order to draw the pixel line, the dispenser 10 may be moved along the drawing direction, or conversely, the electron transportation layer 27 may be moved along a direction opposite to the drawing direction.

Then, as illustrated in FIG. 12 and FIG. 13, the exposure step and the development step are performed collectively for the three colors of the first coating 7, the second coating 8, and the third coating 9. The exposure step does not use a photomask and exposes the entire surface of the electron transportation layer 27.

When the exposure step and development step are performed, as illustrated in FIG. 12 and FIG. 13, a phenomenon of film reduction of the first coating 7, second coating 8, and third coating 9 occurs, and the films are thinned to be 100 nm.

The film thicknesses before the development of the first coating 7, the second coating 8, and the third coating 9 may be different from each other. Since the amounts of film reduction brought by the development of the first coating 7, the second coating 8, and the third coating 9 may be different from each other, each film thickness during the drawing with the first coating 7, the second coating 8, and the third coating 9 needs to be adjusted in accordance with the amount of film reduction.

The manufacturing method of PTL 1 described in the column of background art is a method for manufacturing an organic EL layer with the dimensions of 20 μm to 500 μm in line width and 0.05 μm to 0.5 μm in film thickness, and has a problem that a thin film with tiny dimensions is difficult to be formed in the manufacturing of a quantum dot light emitting diode (QLED) element whose emissive layer is preferably a thin film with a tiny dimension of 50 nm or less.

In contrast, in the first embodiment, the light-emitting element 1 can be manufactured, in which a uniform thin film having a tiny dimension of 50 nm or less is formed, because there are included the application step of applying the first coating 7, the second coating 8 and the third coating 9 containing a photocurable resin and a quantum dot resist, the curing step of curing the first coating 7, the second coating 8 and the third coating 9 having been applied by the application step, and the film thickness adjustment step in which the film thicknesses of the first coating 7, the second coating 8 and the third coating 9 having been cured by the curing step are reduced so as to adjust the film thicknesses.

Even the pixel lines of the same color are drawn by the plurality of different dispensers 10, and therefore a gap is generated between the pixel lines drawn by the different dispensers 10.

Figure 15:
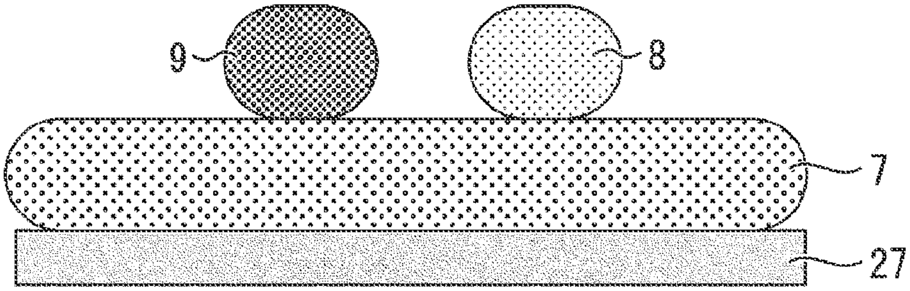
FIG. 15 is a cross-sectional view taken along a plane D-D illustrated in FIG. 14.
Figure 16:
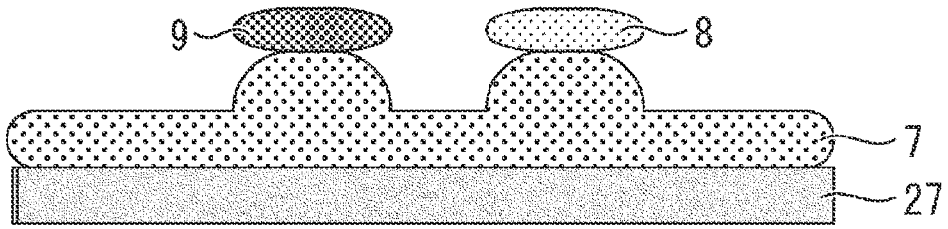
FIG. 16 is a cross-sectional view taken along the plane D-D after exposure and development.

FIG. 14 is a top view illustrating an aspect of drawing the quantum dot resists of three colors on the electron transportation layer 27. FIG. 15 is a cross-sectional view taken along a plane D-D illustrated in FIG. 14. FIG. 16 is a cross-sectional view taken along the plane D-D after exposure and development.

The coating has three types including the first coating 7, second coating 8, and third coating 9. The light-emitting element 1 includes a plurality of pixel lines formed in parallel with each other in the display region 2. In each of the pixel lines, pixels are formed being aligned linearly.

In the application step, the first coating 7, the second coating 8, and the third coating 9 are applied for each of the colors along the pixel line, and the application of coating is turned around by making a U-turn in the peripheral region 3, so that the coatings are continuously applied across the plurality of pixel lines. That is, at least two or more pixel lines of the same color are formed by the function layers being connected continuously via the peripheral region.

Each pixel line may be formed as a function layer of the same thickness by continuously applying the coating with the dispenser 10. In this case, the same thickness means that the thickness of the function layer falls within a range of ±20% of the average function layer thickness.

Different types of coatings are applied to adjacent pixel lines in the display region 2, and two types of coatings are formed overlapping each other in principle in the peripheral region 3. For example, in the plane D-D in the peripheral region 3, as illustrated in FIG. 15, two types of coatings of a part of the first coating 7 and the second coating 8 are formed overlapping each other, and two types of coatings of another part of the first coating 7 and the third coating 9 are formed overlapping each other.

In this manner, as illustrated in FIG. 15, a thick film portion where the first coating 7 and the second coating 8 overlap each other, and a thick film portion where the first coating 7 and the third coating 9 overlap each other are formed in an area where the direction of the drawing with the first coating 7, the second coating 8, and the third coating 9 is turned around making a U-turn in the peripheral region 3. As illustrated in FIG. 16, the films may remain in these thick film portions after development. That is, the portion where the first coating 7 and the second coating 8 overlap each other, and the portion where the first coating 7 and the third coating 9 overlap each other may remain after development with a thickness in a range from tens of nm to hundreds of nm.

Since the peripheral region 3 around the display region 2 is used for a circuit or the like, no problem is caused even when the QD resist of the coating remains, but there is a possibility that the drawing is hindered due to the liquid in the coating being pulled or the like. Then, by shifting the positions of turning around of the first coating 7, the second coating 8, and the third coating 9 from each other along the drawing direction, for example, in the case of separately patterning three colors, the number of layers by which the first coating 7, the second coating 8, and the third coating 9 overlap at the position of turning around does not become three, and may be suppressed to be two at most. Further, the projecting length from the display region 2 to the peripheral region 3 based on the width dimensions of three lines of the first coating 7, the second coating 8, and the third coating 9 corresponds to approximately two lines at the minimum.

However, there may be formed a triple portion where the three types of coatings partially overlap like a portion of a plane M-M in the peripheral region 3. This is because the movement distance of the dispenser 10 may be shortened and consequently the tact time may be shortened by forming the triple portion.

Figure 17:
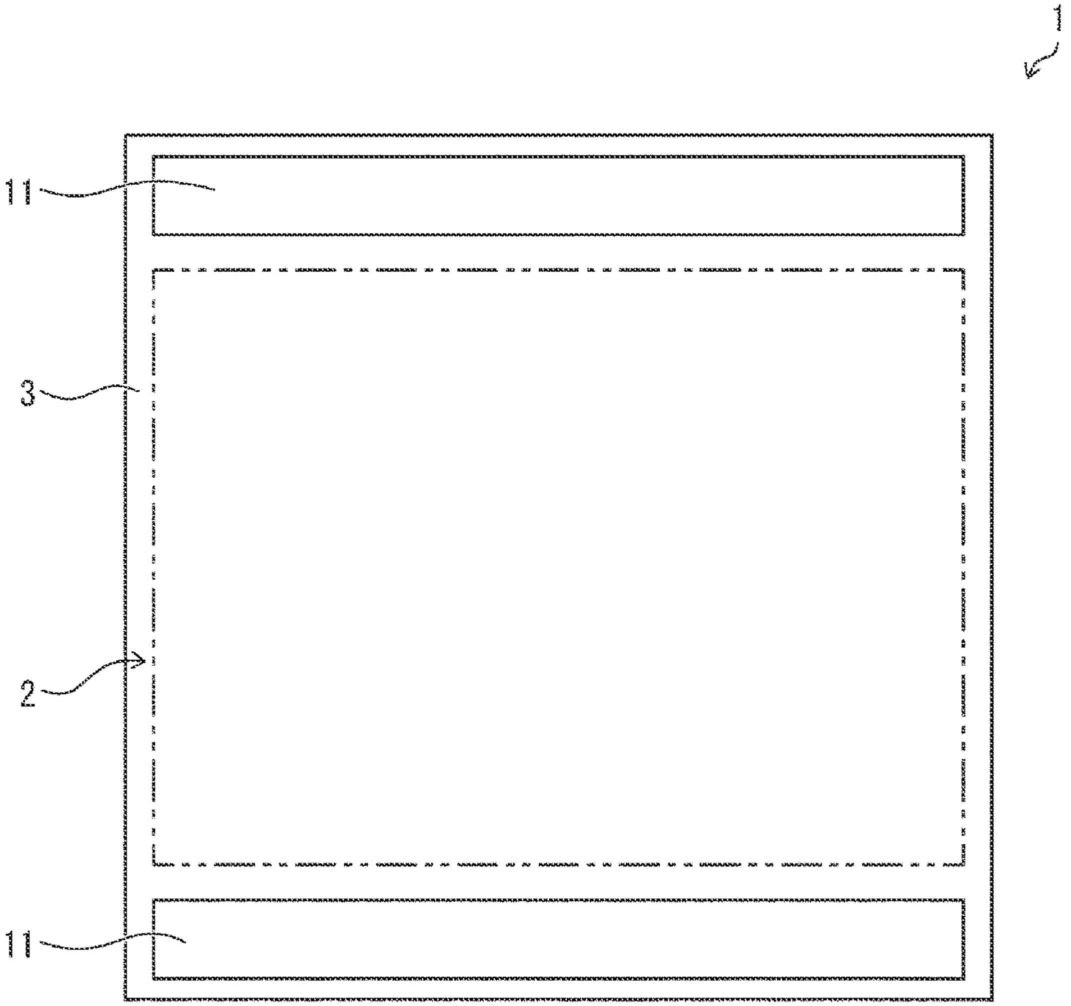
FIG. 17 is a top view illustrating a groove formed in a peripheral region of the functional element.
Figure 18:
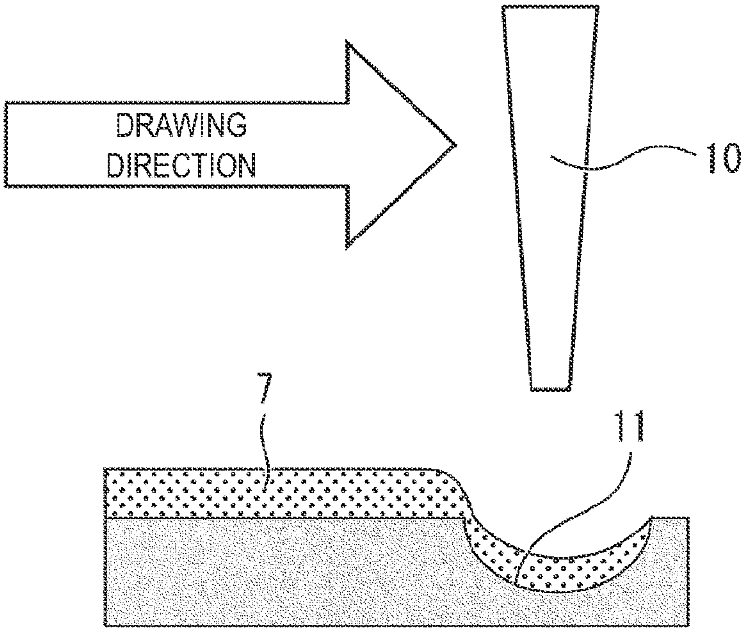
FIG. 18 is a cross-sectional view illustrating the groove.

FIG. 17 is a top view illustrating a groove 11 formed in the peripheral region 3 of the light-emitting element 1, FIG. 18 is a cross-sectional view illustrating the groove 11. The groove 11 is preferably formed in the peripheral region 3 of the light-emitting element 1, where the drawing starts and terminates for the first coating 7, the second coating 8, and the third coating 9. The groove 11 is formed with a dimension of approximately 100 nm by a technique such as mask vapor deposition.

In this manner, the groove 11 is formed in the peripheral region 3, and the coating is applied on the groove 11 in the application step.

Since the electron transportation layer 27 is thin to be approximately 10 nm to 20 nm, it is not possible to form a groove in which a liquid may stay. Thus, the groove 11 is formed in further lower layers such as an interlayer insulating layer, a flattened layer, and the like.

Although the number of steps increases, the steps from the application step to the development step may be repeated for each of the colors. This facilitates the control of film thickness for each color in accordance with heating conditions and development conditions.

Figure 19:
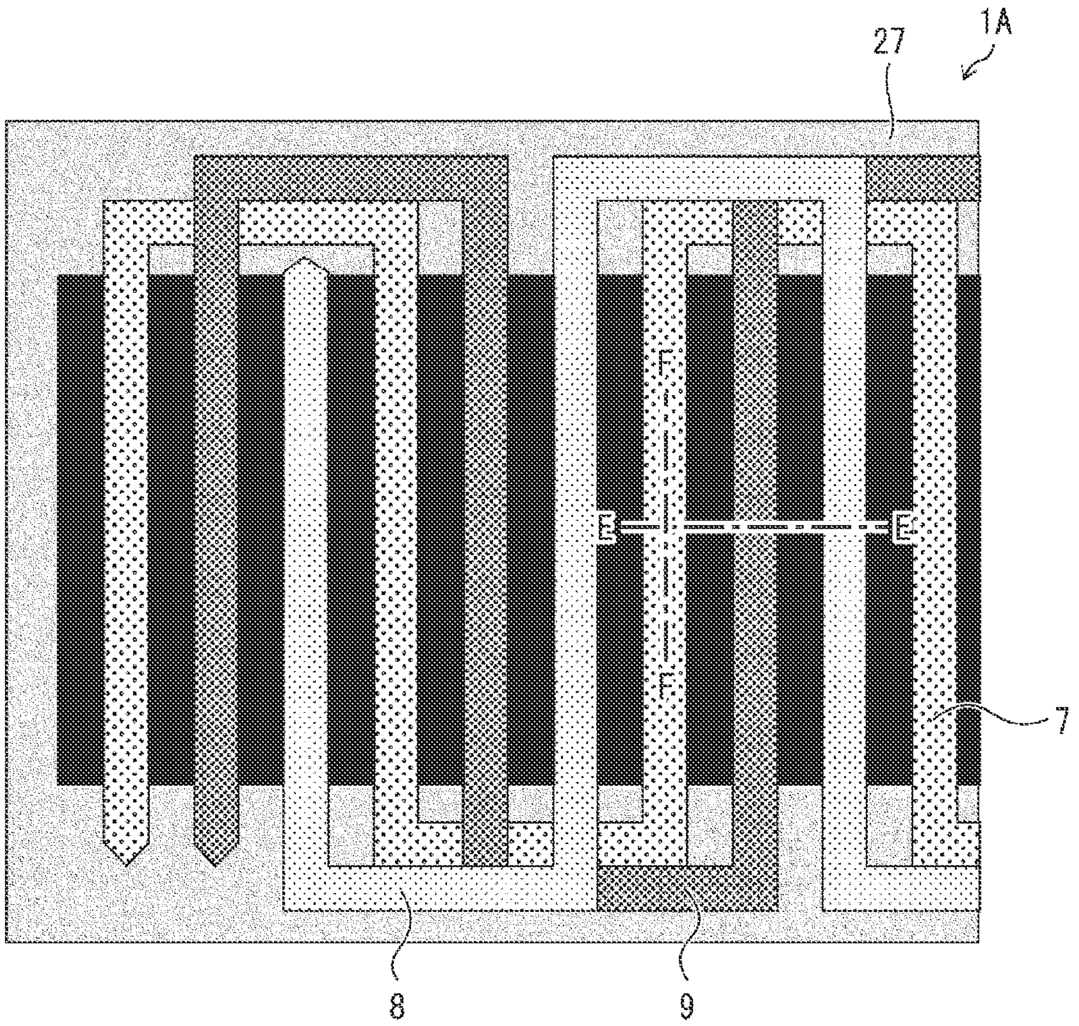
FIG. 19 is a top view of a functional element in which an edge cover is formed.
Figure 20:
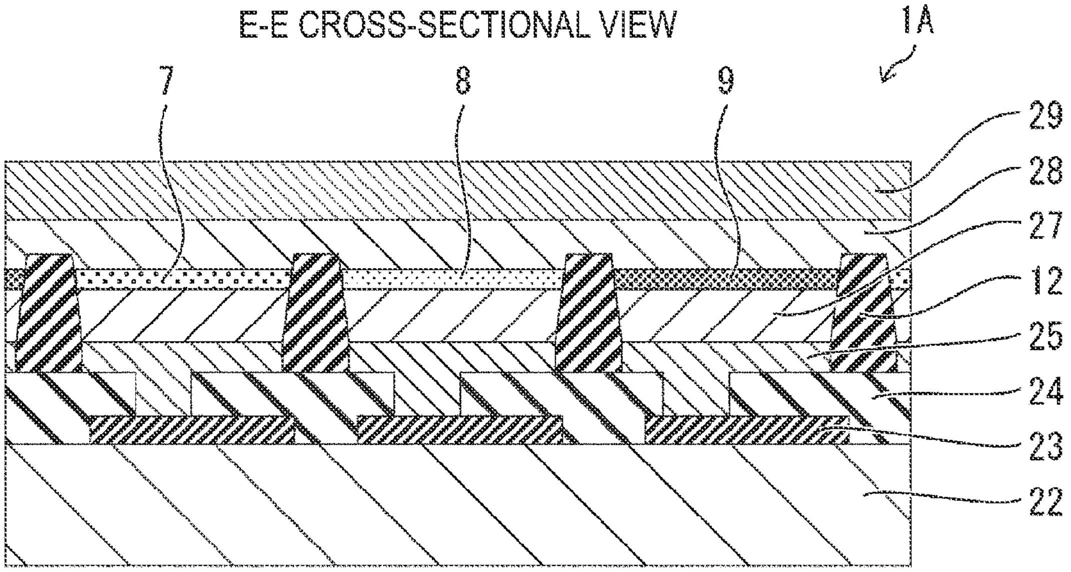
FIG. 20 is a cross-sectional view taken along a plane E-E illustrated in FIG. 19.
Figure 21:
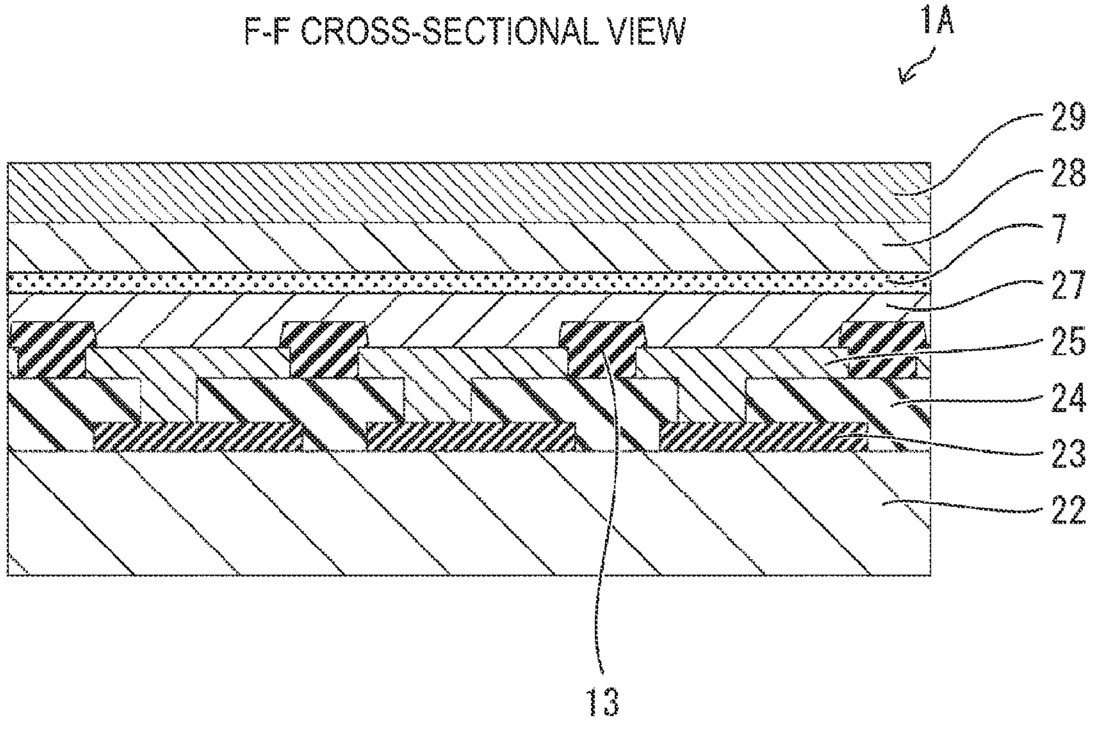
FIG. 21 is a cross-sectional view taken along a plane F-F illustrated in FIG. 19.

FIG. 19 is a top view of a light-emitting element 1A, in which an edge cover is formed. FIG. 20 is a cross-sectional view taken along a plane E-E illustrated in FIG. 19. FIG. 21 is a cross-sectional view taken along a plane F-F illustrated in FIG. 19. Constituent elements similar to the constituent elements described above are given the same reference numerals, and detailed descriptions thereof are not repeated.

Each pixel of the light-emitting element 1A is surrounded by a first edge cover 12 formed along a pixel line between the adjacent pixel lines, and a second edge cover 13 lower in height than the first edge cover 12, orthogonal to the first edge cover 12, and formed at a predetermined interval. The first edge cover 12 formed between the pixel lines of different colors is made to be high to prevent the color mixing of the coatings of different colors. The first edge cover 12 is formed of an organic insulating material such as an acryl-based or polyimide-based insulating material. The first edge cover 12 is preferably colorless and highly transparent from the perspective of the aperture ratio of the pixels of the light-emitting element 1A.

The second edge cover 13 formed in the same color pixel line in a plan view is caused to be low in such a manner as not to interfere with the drawing performed by the dispenser 10.

Figure 22:
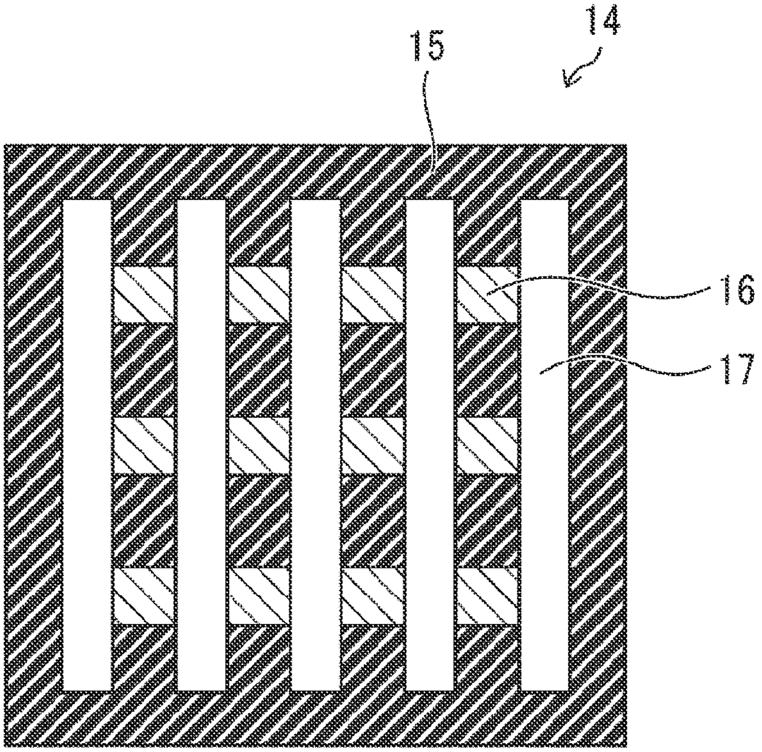
FIG. 22 is a top view illustrating a photomask for forming the edge cover.

FIG. 22 is a top view illustrating a photomask 14 for forming the second edge cover 13. The photomask 14 includes a light blocking portion 15 provided with a plurality of through-grooves having a stripe shape and formed parallel to each other. The light blocking portion 15 includes a plurality of low transmittance portions 16 each formed at a position corresponding to the second edge cover 13 and having low transmittance. The plurality of stripe-shaped through-grooves constitute a high transmittance portion 17 having high transmittance. In this way, the second edge cover 13 including a photoresist is prepared by utilizing the photomask 14 having partially different transmittance.

Figure 23:
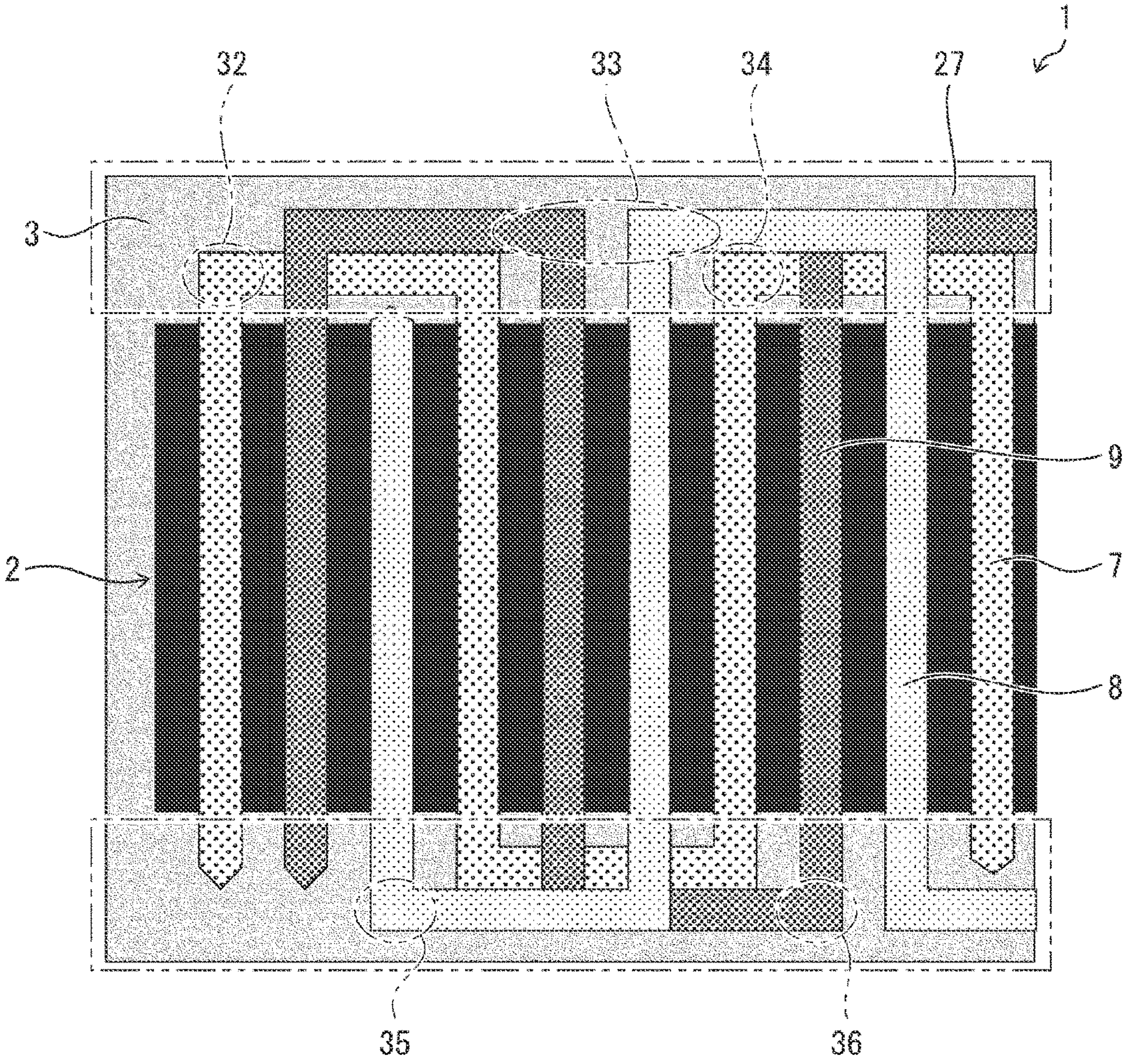
FIG. 23 is a top view for describing a usage aspect of a peripheral region of the functional element.

FIG. 23 is a top view for describing a usage aspect of the peripheral region 3 of the light-emitting element 1. The peripheral region 3 disposed around the display region 2 may be used to display clock information, or to display system information such as information of a power supply lamp.

Figure 24:
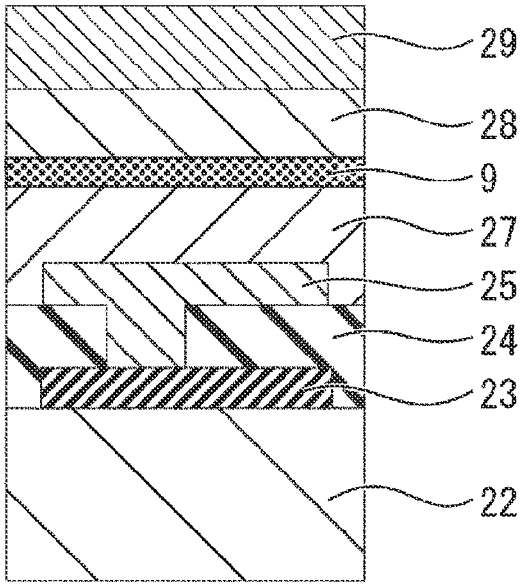
FIG. 24 is a cross-sectional view illustrating the same layer configuration of a peripheral region as the layer configuration of a display region of the functional element.
Figure 25:
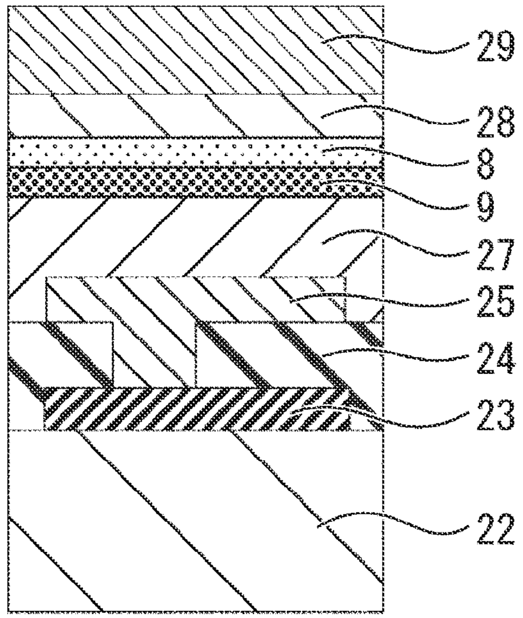
FIG. 25 is a cross-sectional view illustrating a different layer configuration of the peripheral region from the layer configuration of the display region.
Figure 26:
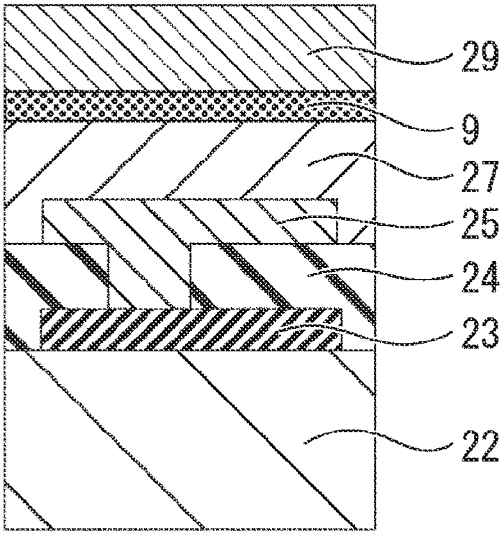
FIG. 26 is a cross-sectional view illustrating another different layer configuration of the peripheral region from the layer configuration of the display region.

FIG. 24 is a cross-sectional view illustrating the same layer configuration of the peripheral region 3 as the layer configuration of the display region 2 of the light-emitting element 1. FIG. 25 is a cross-sectional view illustrating a different layer configuration of the peripheral region 3 from the layer configuration of the display region 2. FIG. 26 is a cross-sectional view illustrating another different layer configuration of the peripheral region 3 from the layer configuration of the display region 2.

Portions of the peripheral region 3 where no overlap of the coatings of different colors is present may be utilized as inspection regions 32, 33, 34, 35, and 36 for directly testing the light emission of the pixels by providing test patterns for the test in advance. The inspection regions 32, 33, 34, 35, and 36 of the peripheral region 3 used for the light emission test are required to have the same layer configuration as the layer configuration of the display region 2 as illustrated in FIG. 24; therefore, it is not allowed that the second coating 8 and the third coating 9, which are different color coatings, overlap with each other as illustrated in FIG. 25, and it is also not allowed that a hole transportation layer 28 is missing as illustrated in FIG. 26.

Figure 27:
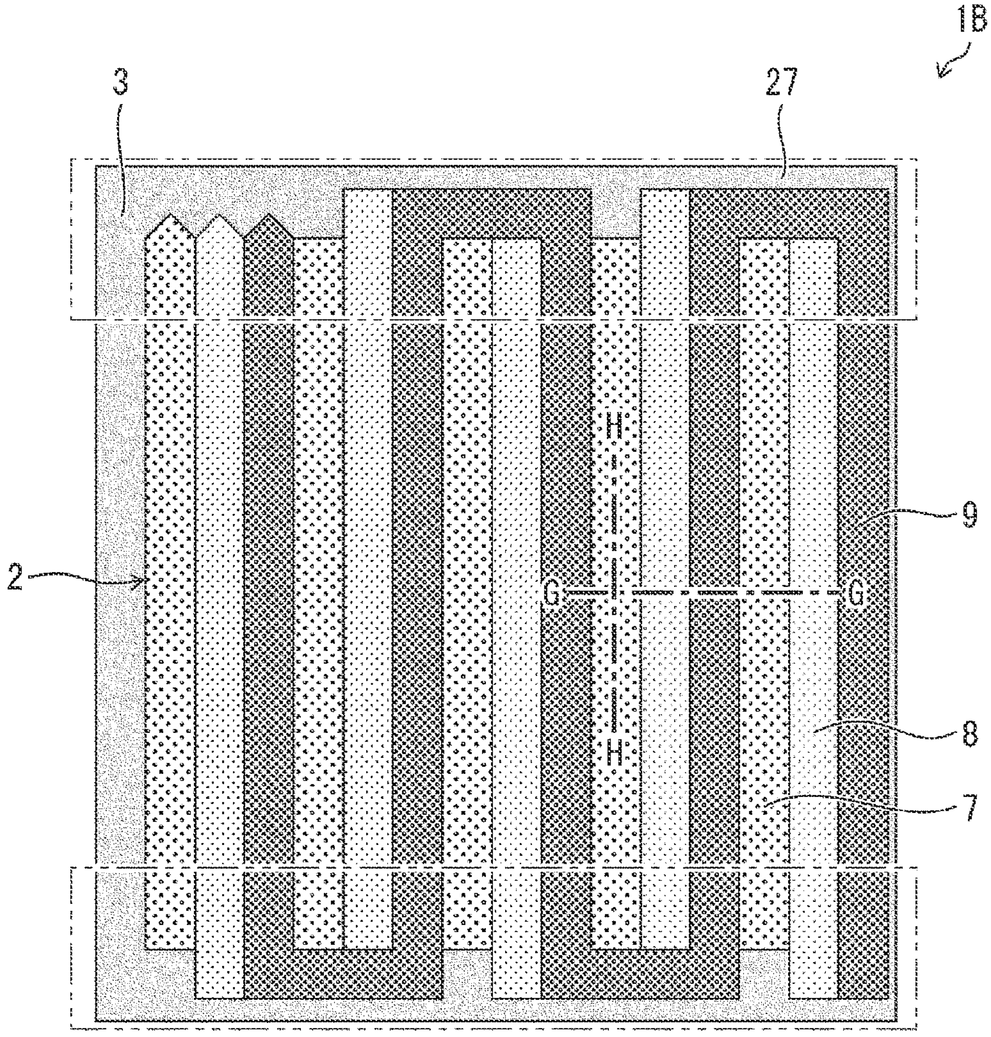
FIG. 27 is a top view illustrating an aspect of drawing quantum dot resists of three colors without a bank on the substrate.
Figure 28:
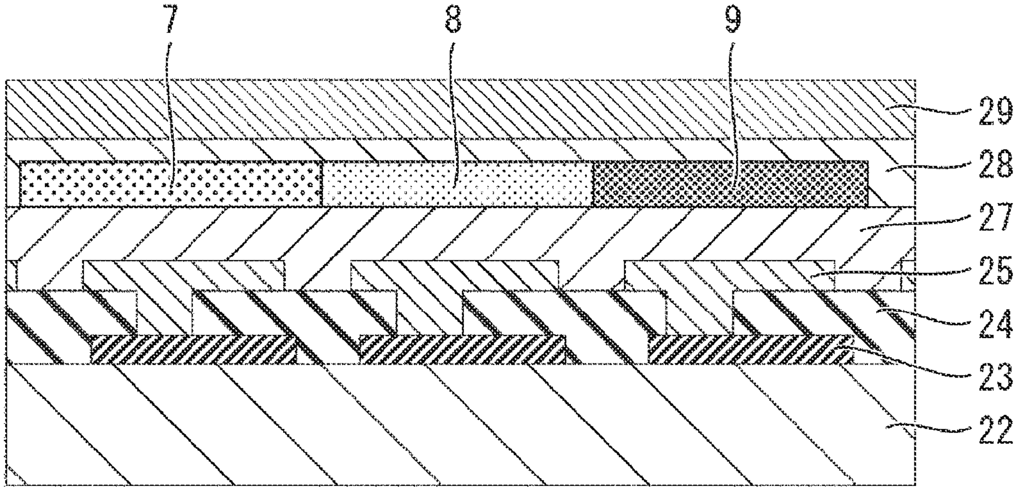
FIG. 28 is a cross-sectional view taken along a plane G-G illustrated in FIG. 27.
Figure 29:
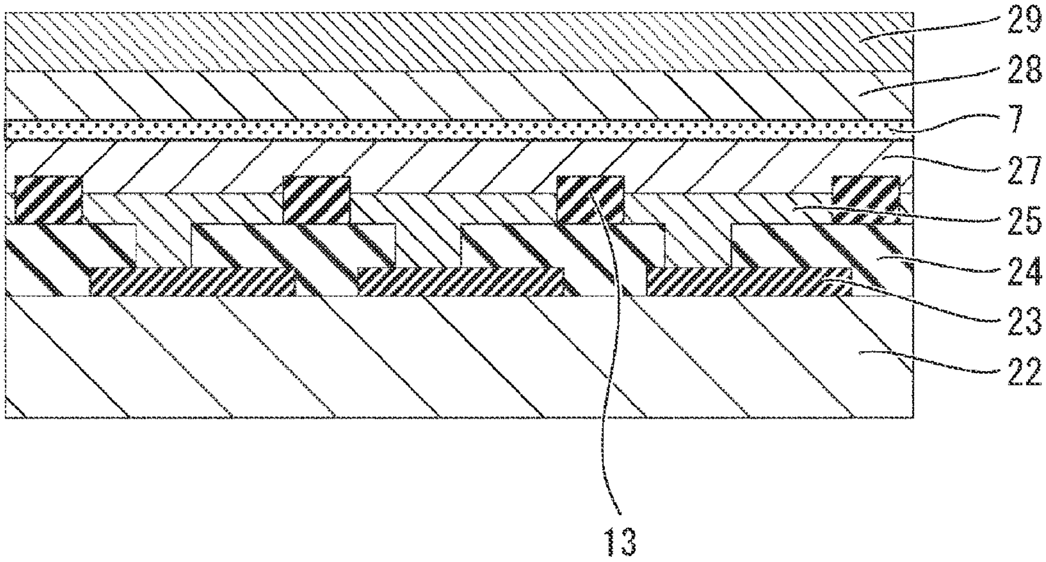
FIG. 29 is a cross-sectional view taken along a plane H-H illustrated in FIG. 27.

FIG. 27 is a top view illustrating an aspect of drawing the quantum dot resists of three colors on the electron transportation layer 27 without the bank 6. FIG. 28 is a cross-sectional view taken along a plane G-G illustrated in FIG. 27, FIG. 29 is a cross-sectional view taken along a plane H-H illustrated in FIG. 27.

In a light-emitting element 1B, the first coating 7, the second coating 8, and the third coating 9 are applied to the electron transportation layer 27 without the bank 6. That is, the coatings of the first coating 7, the second coating 8, and the third coating 9 applied to the display region 2 are formed by the different types of coatings in contact with each other.

By using the coating of the QD resist having high viscosity, the emissive layer can be formed without the bank 6. Thus, the luminance is enhanced due to the improvement in the aperture ratio of the pixels of the light-emitting element 1B, and the total of the steps may be shortened because the step of forming the banks 6 is omitted.

Figure 30:
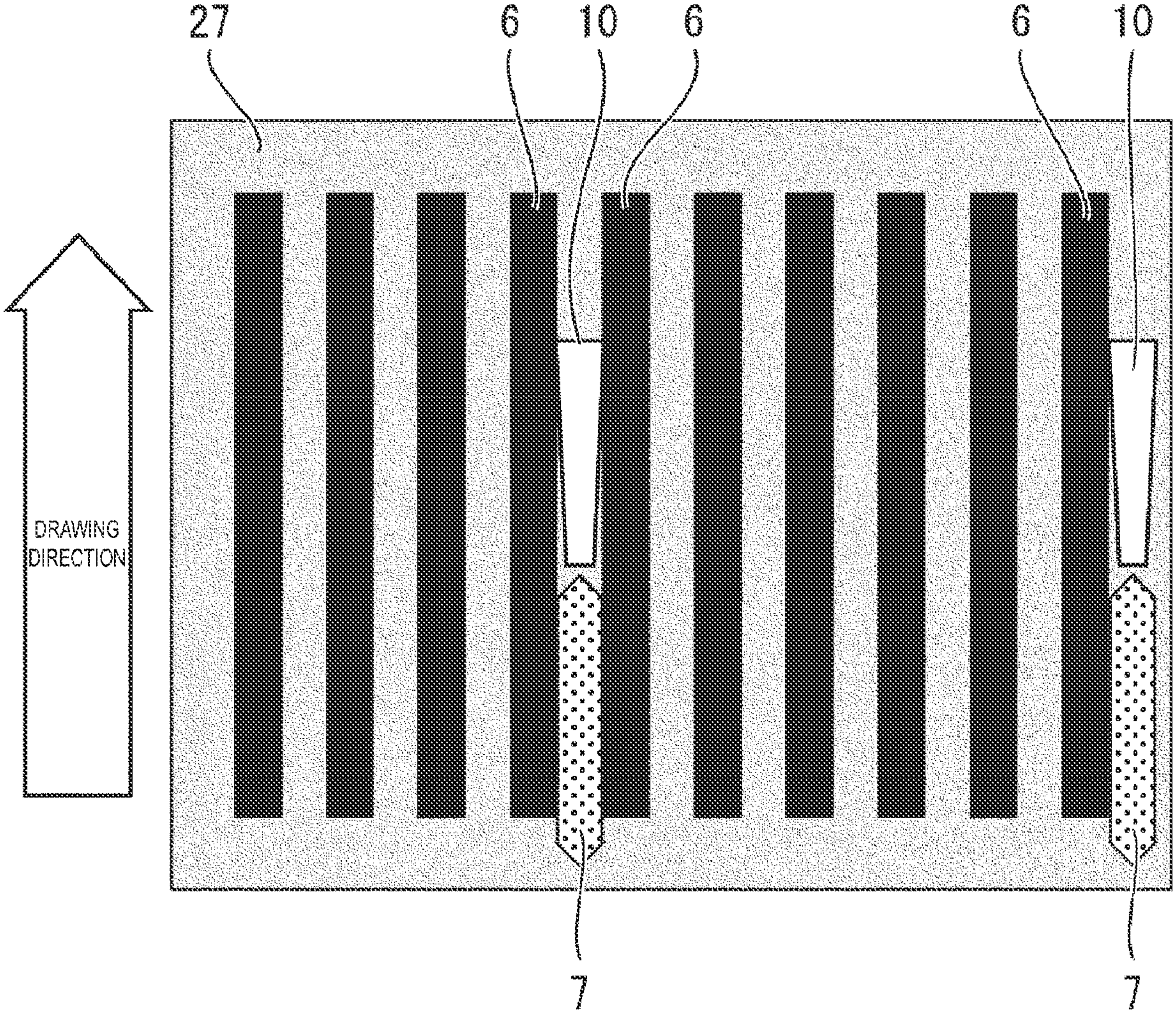
FIG. 30 is a top view illustrating an aspect of drawing, before a U-turn, a quantum dot resist for changing a pixel line film thickness for each of three colors.
Figure 31:
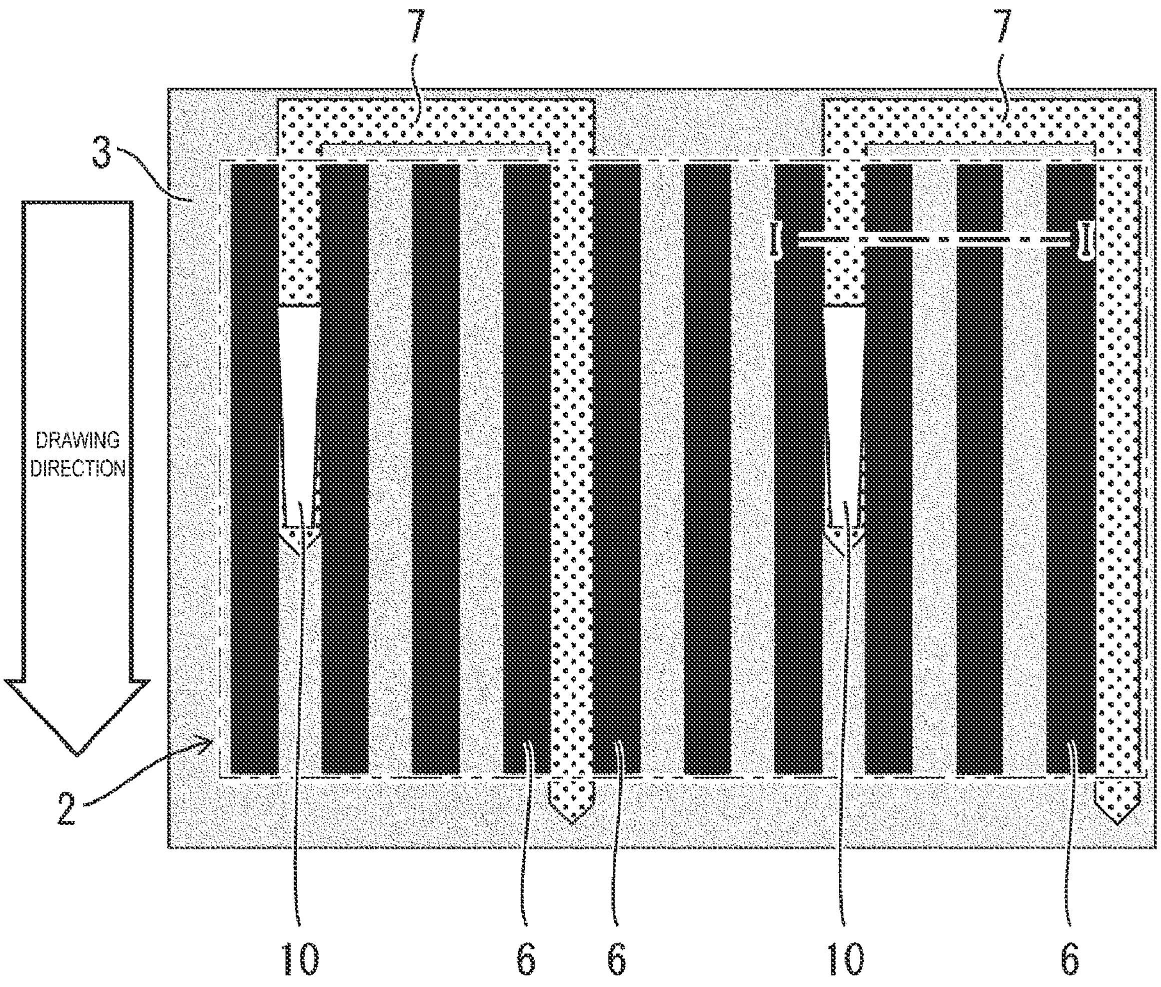
FIG. 31 is a top view illustrating an aspect of drawing, after a U-turn, a quantum dot resist for changing the pixel line film thickness.
Figure 32:
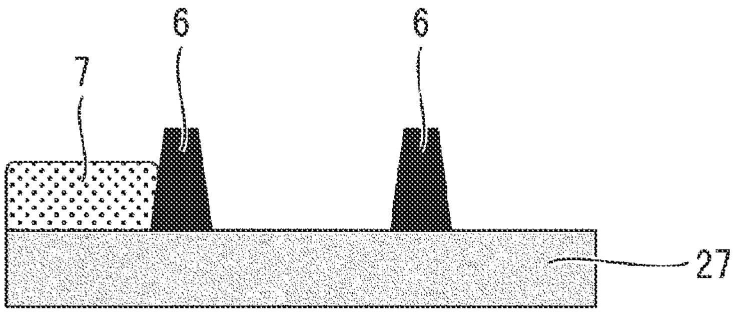
FIG. 32 is a cross-sectional view taken along a plane I-I illustrated in FIG. 31.
Figure 33:
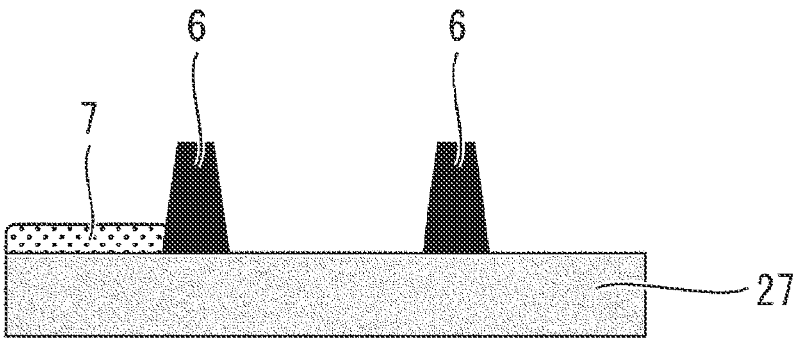
FIG. 33 is a cross-sectional view taken along the plane I-I after exposure and development.
Figure 34:
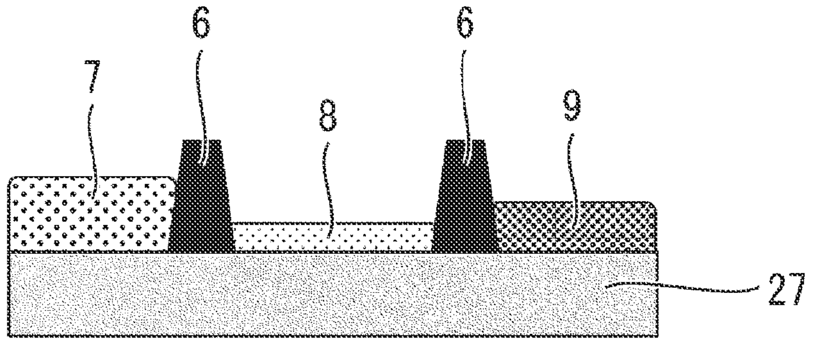
FIG. 34 is a cross-sectional view taken along the plane I-I after repeating the drawing the number of times corresponding to necessary colors.
Figure 35:
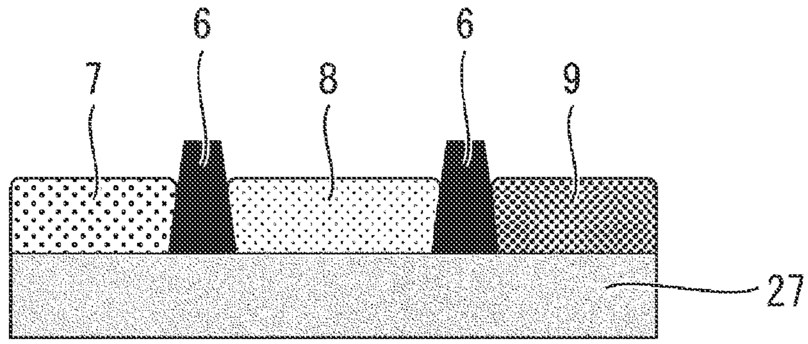
FIG. 35 is a cross-sectional view taken along the plane I-I after all colors are drawn first.
Figure 36:
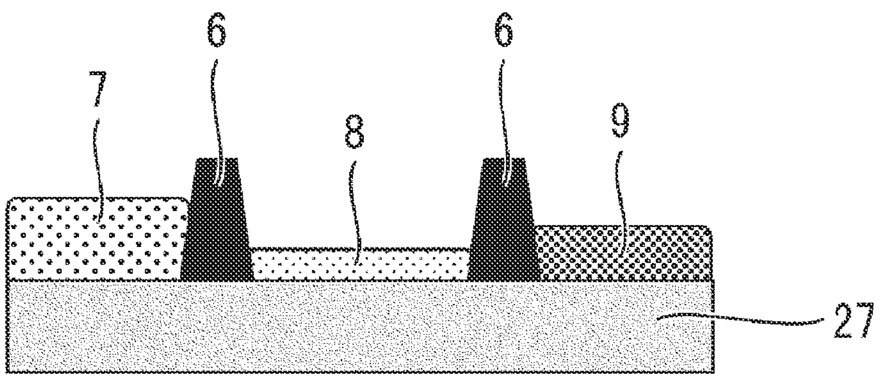
FIG. 36 is a cross-sectional view taken along the plane I-I after exposure and development.

FIG. 30 is a top view illustrating an aspect of drawing, before a U-turn, a quantum dot resist for changing a pixel line film thickness for each of three colors. FIG. 31 is a top view illustrating an aspect of drawing, after a U-turn, a quantum dot resist for changing the pixel line film thickness. FIG. 32 is a cross-sectional view taken along a plane I-I illustrated in FIG. 31. FIG. 33 is a cross-sectional view taken along the plane I-I after exposure and development. FIG. 34 is a cross-sectional view taken along the plane I-I after repeating the drawing the number of times corresponding to necessary colors. FIG. 35 is a cross-sectional view taken along the plane after all colors are drawn first. FIG. 36 is a cross-sectional view taken along the plane after exposure and development. Constituent elements similar to the constituent elements described above are given the same reference numerals, and detailed descriptions thereof are not repeated.

By changing the development conditions and exposure conditions for each color, pixel lines whose film thicknesses differ depending on each of the colors can be formed. FIGS. 32 to 34 illustrates cross-sectional views in a case where exposure and development are performed for each color. First, the first coating 7 relating to red light is used for drawing on the electron transportation layer 27. Then, the first coating 7 set by drawing on the electron transportation layer 27 is exposed and developed. Subsequently, the second coating 8 relating to green light is used for drawing on the electron transportation layer 27. Thereafter, the second coating 8 set by drawing on the electron transportation layer 27 is exposed and developed. Thereafter, the third coating 9 relating to blue light is used for drawing on the electron transportation layer 27. Then, the third coating 9 set by drawing on the electron transportation layer 27 is exposed and developed. Since the amounts of film reduction of the first coating 7, the second coating 8, and the third coating 9 are different from each other, the thicknesses of the first coating 7, the second coating 8, and the third coating 9 are different from each other as illustrated in FIG. 34.

Since the optimum thickness for improving the luminous efficiency is present for each color, a functional element with high efficiency can be prepared when the conditions are adjusted such that each of the first coating 7, the second coating 8, and the third coating 9 has the optimal thickness. As illustrated in FIGS. 32 to 34, the drawing, exposure, and development may be repeated every color; alternatively, as illustrated in FIG. 35 and FIG. 36, after the coatings of all colors of the first coating 7, the second coating 8, and the third coating 9 are set by drawing, the remaining film thicknesses of the first coating 7, the second coating 8, and the third coating 9 may be adjusted by exposing these coatings by using a halftone mask and changing the exposure amount for each color.

Second Embodiment

Figure 37:
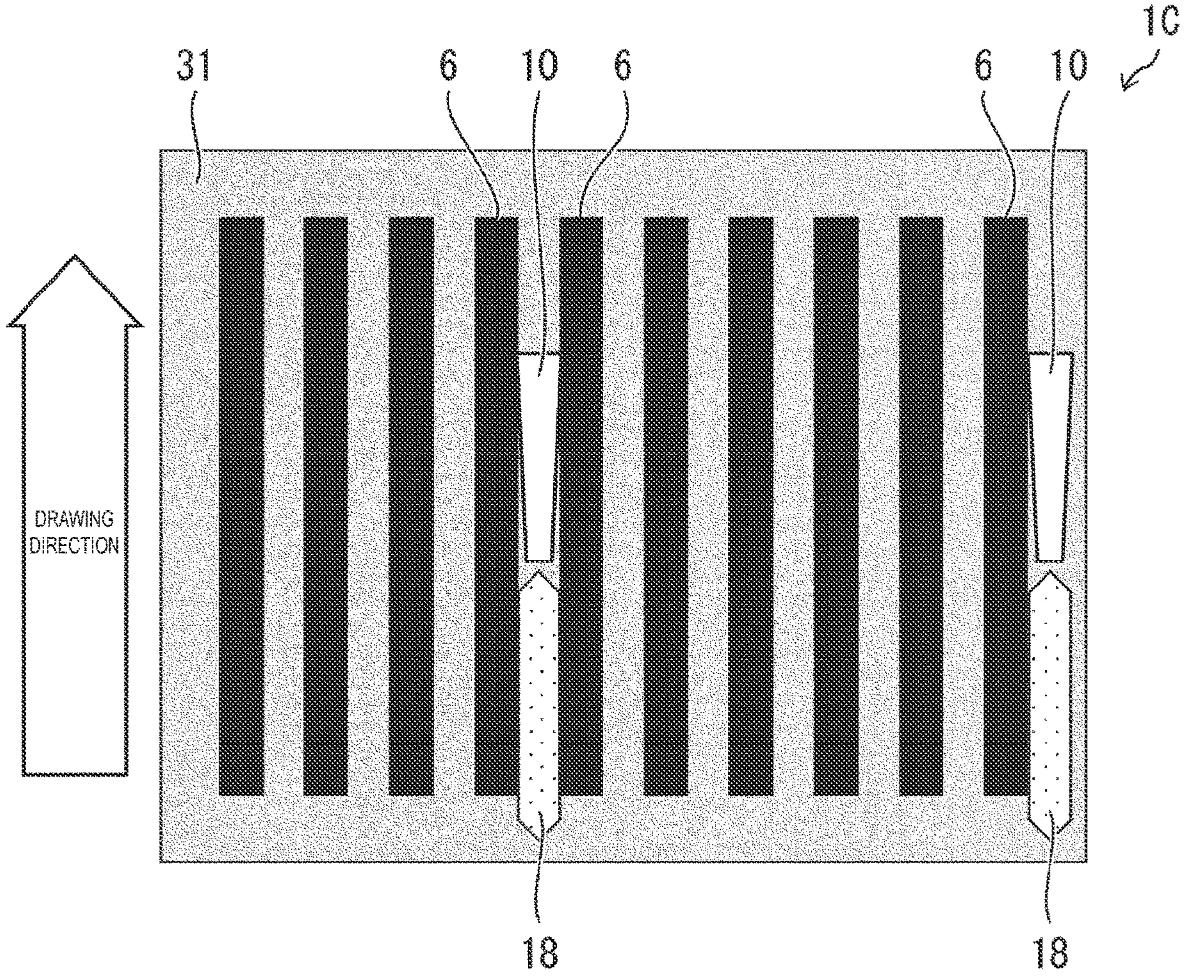
FIG. 37 is a top view illustrating an aspect of drawing, before a U-turn, with a charge transportation layer material according to a second embodiment.
Figure 38:
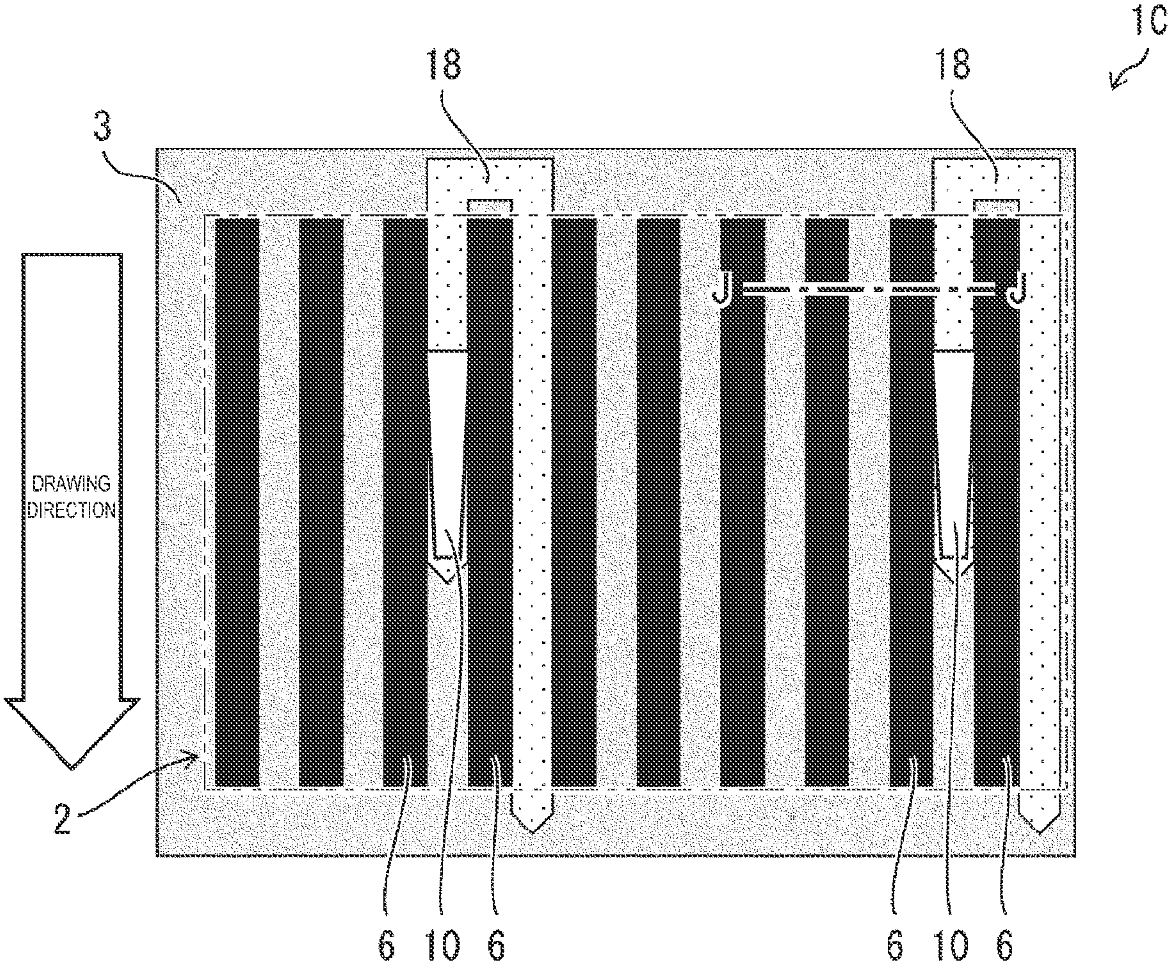
FIG. 38 is a top view illustrating an aspect of drawing, after a U-turn, with the charge transportation layer material.
Figure 39:
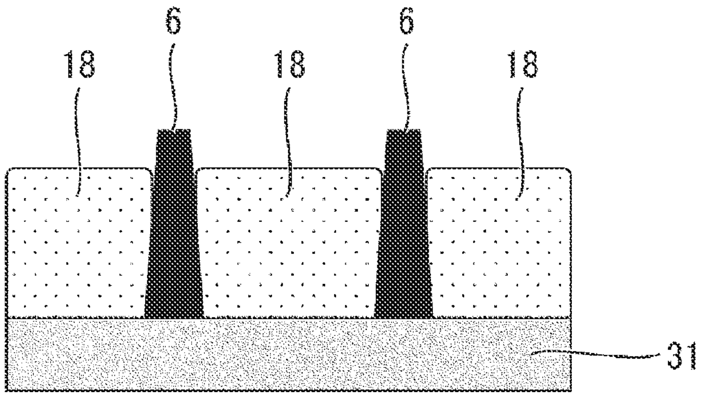
FIG. 39 is a cross-sectional view taken along a plane J-J illustrated in FIG. 38.
Figure 40:
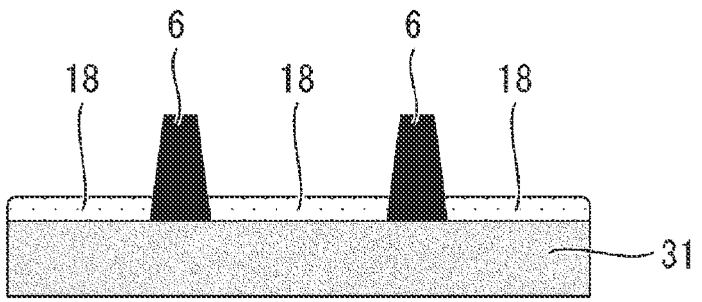
FIG. 40 is a cross-sectional view taken along the plane J-J after exposure and development.

FIG. 37 is a top view illustrating an aspect of drawing, before a U-turn, with a charge transportation layer material 18 according to a second embodiment. FIG. 38 is a top view illustrating an aspect of drawing, after a U-turn, with the charge transportation layer material 18. FIG. 39 is a cross-sectional view taken along a plane J-J illustrated in FIG. 38. FIG. 40 is a cross-sectional view taken along the plane J-J after exposure and development. Constituent elements similar to the constituent elements described above are given the same reference numerals, and detailed descriptions thereof are not repeated.

A light-emitting element 1C includes a display region 2, in which pixels are formed, and a peripheral region 3 formed outside the display region 2. The pixels of a plurality of colors are formed in the display region 2. The functional material includes the charge transportation layer material 18 for forming an electron transportation layer 27 and a hole transportation layer 28.

In an application step, the charge transportation layer material 18 is applied for drawing by two dispensers 10 on a lower layer 31 of a charge transportation layer as illustrated in FIG. 37 and FIG. 38. Examples of the charge transportation layer material 18 may include, as a hole transportation layer material for forming the hole transportation layer 28, those that may be used as nanoparticles, such as NiO, CuI, $Cu_2O$, CoO, $Cr_2O_3$, and $CuAlS_2$, and may also include, as an electron transportation material for forming the electron transportation layer 27, those that may be used as nanoparticles, such as ZnO, ZnS, ZrO, MgZnO, AlZnO, and $TiO_2$.

The volume ratio of the nanoparticles in the film is preferably approximately 70% or more from the perspective of securing electrical conductivity, but it is allowed to be less than approximately 70% as long as the insulating properties can be secured.

When the charge transportation layer material 18 set by drawing on the lower layer 31 of the charge transportation layer is exposed and developed, a phenomenon of film reduction occurs in which the film thickness of the charge transportation layer material 18 decreases, and consequently the charge transportation layer material 18 is thinned to be 100 nm or less.

In order to expose the charge transportation layer material 18, a photomask may be used, or may not be used. By using a halftone mask, the exposure amount may be changed for each pixel line, and the thickness of the charge transportation layer may be changed for each pixel line. This is because the optimum condition of the thickness of the charge transportation layer may vary depending on the color of light emitted by the corresponding emissive layer.

Figure 41:
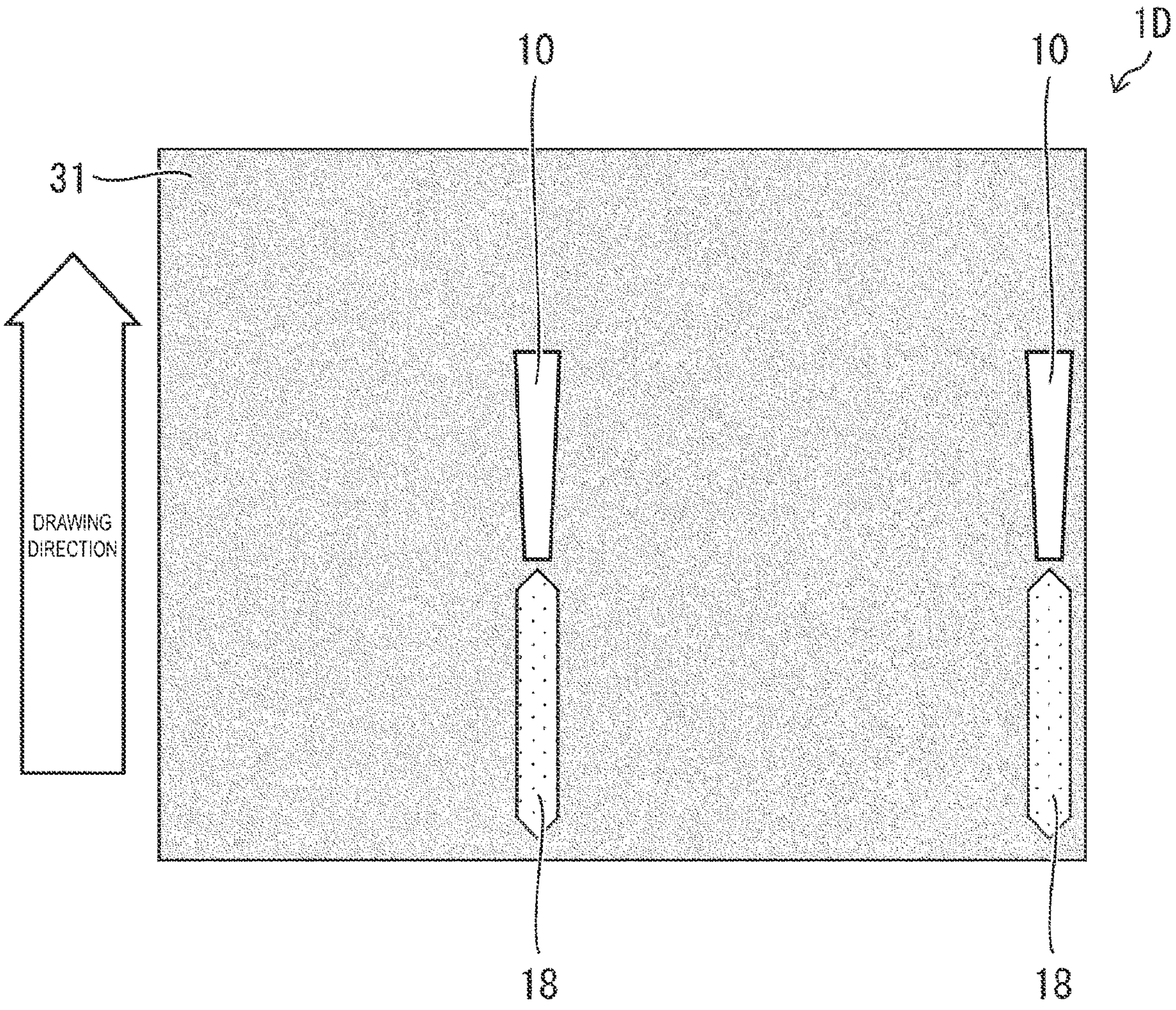
FIG. 41 is a top view illustrating another aspect of drawing, before a U-turn, with the charge transportation layer material.
Figure 42:
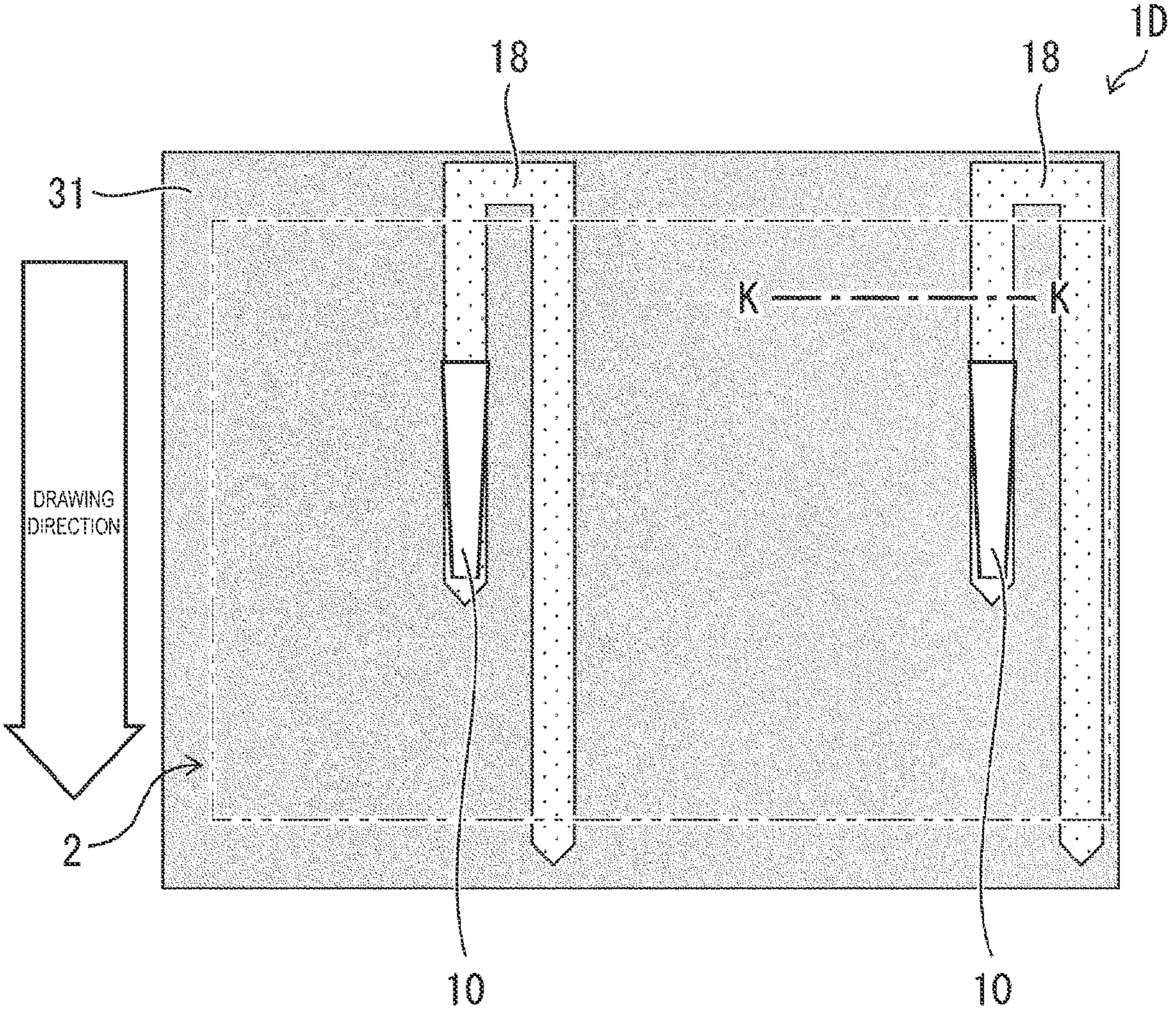
FIG. 42 is a top view illustrating another aspect of drawing, after a U-turn, with the charge transportation layer material.
Figure 43:
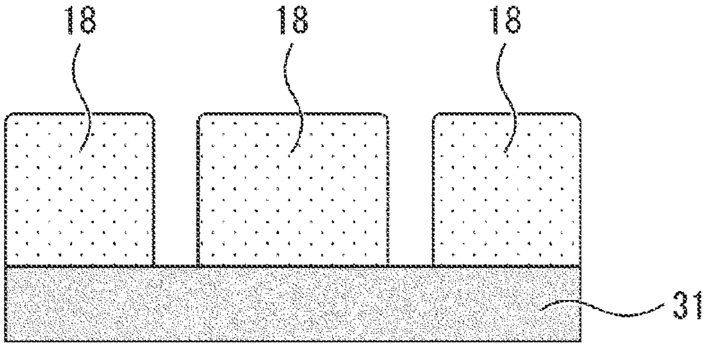
FIG. 43 is a cross-sectional view taken along a plane K-K illustrated in FIG. 42.
Figure 44:
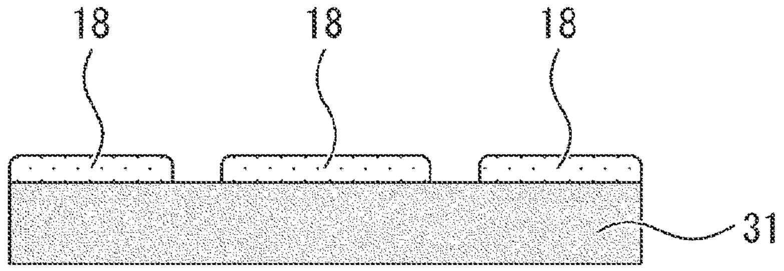
FIG. 44 is a cross-sectional view taken along the plane K-K after exposure and development.

FIG. 41 is a top view illustrating another aspect of drawing, before a U-turn, with the charge transportation layer material 18. FIG. 42 is a top view illustrating another aspect of drawing, after a U-turn, with the charge transportation layer material 18. FIG. 43 is a cross-sectional view taken along a plane K-K illustrated in FIG. 42. FIG. 44 is a cross-sectional view taken along the plane K-K after exposure and development. Constituent elements similar to the constituent elements described above are given the same reference numerals, and detailed descriptions thereof are not repeated.

The charge transportation layer material 18 may be used for drawing on the lower layer 31 of the charge transportation layer on which the bank 6 is not formed, as illustrated in FIGS. 41 to 44. When drawing is performed on the lower layer 31 of the charge transportation layer where the bank 6 is not formed, the charge transportation layer material 18 is used for drawing in a zigzag shape at a predetermined interval in the display region 2.

Figure 45:
FIG. 45 is a top view illustrating an aspect in which a mixture of the charge transportation layer material and a photoresist is applied to a lower layer of a charge transportation layer.
Figure 46:
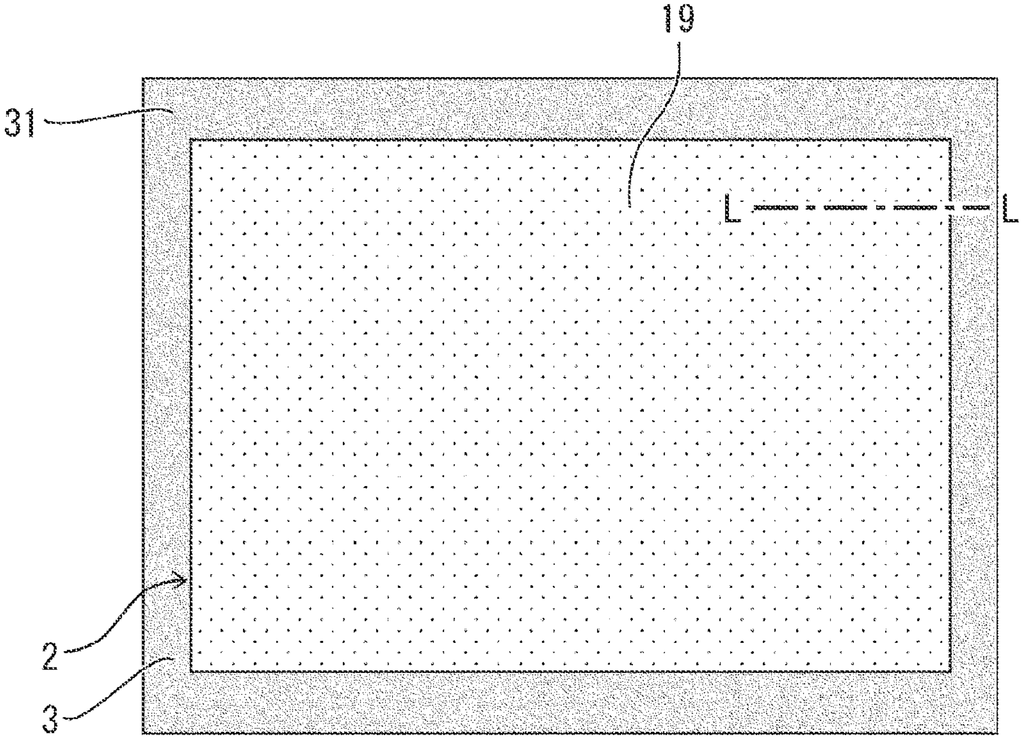
FIG. 46 is a top view illustrating an aspect in which a mixture of a charge transportation layer material and a photoresist applied to a lower layer of a charge transportation layer is exposed.
Figure 47:
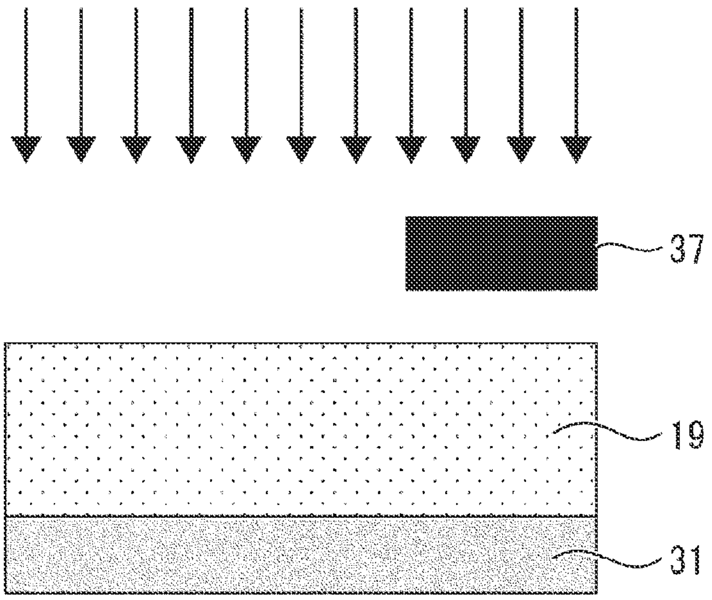
FIG. 47 is a cross-sectional view taken along a plane L-L illustrated in FIG. 46.
Figure 48:
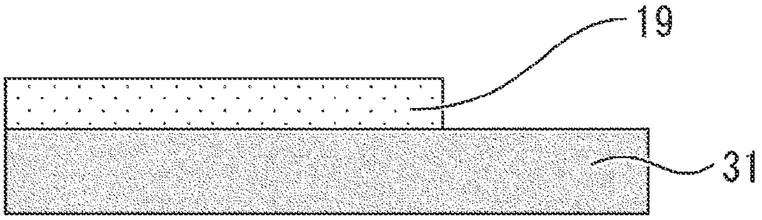
FIG. 48 is a cross-sectional view taken along the plane L-L after exposure and development.

FIG. 45 is a top view illustrating an aspect in which a mixture 19 of the charge transportation layer material 18 and a photoresist is applied to the lower layer 31 of the charge transportation layer. FIG. 46 is a top view illustrating an aspect in which the mixture 19 of the charge transportation layer material 18 and the photoresist applied to the lower layer 31 of the charge transportation layer is exposed. FIG. 47 is a cross-sectional view taken along a plane L-L illustrated in FIG. 46. FIG. 48 is a cross-sectional view taken along the plane L-L after exposure and development. Constituent elements similar to the constituent elements described above are given the same reference numerals, and detailed descriptions thereof are not repeated.

First, as illustrated in FIG. 45, the mixture 19 of the charge transportation layer material 18 and the photoresist is applied to an entire surface of the lower layer 31 of the charge transportation layer. As the application technique, the spin coating, slit coater, or the like may be used. The example of FIG. 46 illustrates a case where a film of the mixture 19 is not formed in the peripheral region 3 when a wiring line pattern in the peripheral region 3 is required to be exposed, or the like; only the display region 2 is exposed, the peripheral region 3 is not exposed, and the mixture 19 applied to the peripheral region 3 is dissolved and removed by development.

Then, as illustrated in FIG. 47, the mixture 19 applied to the lower layer 31 of the charge transportation layer is subjected to pattern exposure while being shielded from light with a photomask 37 as necessary. Then, the exposed mixture 19 is developed to adjust the film thickness of the mixture 19 to the desired thickness.

The presence or absence of the bank 6 on the lower layer 31 of the charge transportation layer is optional, but it is necessary to secure insulation between the pixels by forming a contact hole cover in advance, or the like. The mixture 19 to be applied in the display region 2 may be patterned. By using a halftone mask, the exposure amount may be changed for each pixel line, and the thickness of the charge transportation layer may be changed for each color.

In the embodiments described above, a case in which the functional element is a light-emitting element is mainly indicated, but the disclosure is not limited thereto. The functional element according to the disclosure may be a light-receiving element such as a photodetector or an optical sensor. The light-receiving element may include a pixel configured to receive external light, and quantum dots may be used for forming the pixel. Such light-receiving element may be manufactured by the manufacturing method described above.

In the case where the functional element is a light-receiving element, a function layer such as a light-receiving layer or a color filter is formed in the light-receiving element. In the pixels of different colors in such light-receiving element, the materials of the function layers may be the same or may be different. For example, when quantum dots are used in the function layer, pixels of different colors may be achieved by making the particle sizes of the quantum dots differ from each other even in the case where the quantum dots are made of the same material.

Although the functional elements of the above-described embodiments have been described mainly focusing on a quantum dot light emitting diode (QLED) whose functional material is quantum dots, the functional element may be formed as an organic light-emitting diode (OLED) whose functional material is an organic EL material.

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in each of the embodiments.

REFERENCE SIGNS LIST

1 Light-emitting element (Functional element)
2 Display region (Functional region)
3 Peripheral region
4 Emissive layer

7 First coating (Coating)
8 Second coating (Coating)
9 Third coating (Coating)
10 Dispenser
11 Groove
12 First edge cover
13 Second edge cover
18 Charge transportation layer material

The invention claimed is:

1. A method for manufacturing a light-emitting element including a pixel in which a cathode electrode, an electron transportation layer, an emissive layer, a hole transportation layer, and an anode electrode are formed in a stated order on a substrate, the method comprising:

applying a coating for forming the emissive layer on the electron transportation layer, the coating containing a curable material and a functional material, the functional material including quantum dots;

curing the coating applied; and adjusting a film thickness of the cured coating to decrease the film thickness of the coating, wherein the coating has such a high viscosity that a shape of the applied coating does not change during the application of the coating, the coating is applied by a dispenser, the light-emitting element includes a display region in which the pixel is formed, and a peripheral region formed outside the display region, in the applying the coating, application of the coating starts from a portion of the peripheral region, continues through the display region, and terminates at another portion of the peripheral region, the coating has three or more types, each having a different light-emitting color of the quantum dots, the light-emitting element is formed by a plurality of pixels, including the pixel, being linearly aligned in the display region, and includes a plurality of pixel lines formed in parallel with each other, the coating is applied along a pixel line, among the plurality of pixel lines, for each of the three or more types of the coating, and is continuously applied across the plurality of pixel lines by the coating application being turned around in the peripheral region, and different types of the coatings are applied to adjacent pixel lines, among the plurality of pixel lines, in the display region, and two types of the coatings at most are formed overlapping each other in the peripheral region.

2. The method for manufacturing the light-emitting element according to claim 1, wherein the curable material is a photocurable resin, the coating is cured by exposing the coating to light, and the film thickness of the coating is decreased by dissolving the coating with a developing solution.

3. The method for manufacturing the light-emitting element according to claim 1, wherein the curable material is a thermosetting resin, the coating is cured by heating the coating, and the film thickness of the coating is decreased by etching the coating.

4. The method for manufacturing the light-emitting element according to claim 1, wherein the coating contains a cellulose nanofiber.

5. The method for manufacturing the light-emitting element according to claim 1, wherein the pixel is surrounded by a first edge cover formed between and along the adjacent pixel lines, and a second edge cover lower in height than the first edge cover, orthogonal to the first edge cover, and formed at a predetermined interval.

6. The method for manufacturing the light-emitting element according to claim 1, wherein the coating applied in the display region is formed by different types of the coatings in contact with each other.

7. The method for manufacturing the light-emitting element according to claim 1, wherein a groove is formed in the peripheral region, and the coating is applied on the groove.

8. The method for manufacturing the light-emitting element according to claim 1, wherein the three or more types of the coating comprises a first coating, a second coating, and a third coating, the first coating, the second coating, and the third coating are each applied to have a predetermined film thickness, and the adjusting the film thickness is performed after the first coating, the second coating, and the third coating are cured.

9. The method for manufacturing the light-emitting element according to claim 1, wherein the three or more types of the coating comprises a first coating, a second coating, and a third coating, the first coating, the second coating, and the third coating each have a different light-emitting color of the quantum dots, the first coating, the second coating, and the third coating are each cured by exposing to light, the adjusting the film thickness is performed after the first coating, the second coating, and the third coating are cured, and the first coating, the second coating, and the third coating are exposed to different amounts of light depending on the light-emitting color.

10. The method for manufacturing the light-emitting element according to claim 1, wherein the three or more types of the coating comprises a first coating, a second coating, and a third coating, and the applying the coating, the curing the coating, and the adjusting the film thickness are performed for each of the coatings of the first coating, the second coating, and the third coating.

* * * * *